United States Patent
Chunduri et al.

(10) Patent No.: US 11,496,388 B2
(45) Date of Patent: Nov. 8, 2022

(54) RESOURCE RESERVATION AND MAINTENANCE FOR PREFERRED PATH ROUTES IN A NETWORK

(71) Applicant: HUAWEI TECHNOLOGIES CO., LTD., Shenzhen (CN)

(72) Inventors: Uma S. Chunduri, Fremont, CA (US); Renwei Li, Fremont, CA (US); Alvaro Retana, Raleigh, NC (US); Alexander Clemm, Los Gatos, CA (US); Lin Han, San Jose, CA (US); Yingzhen Qu, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/078,838

(22) Filed: Oct. 23, 2020

(65) Prior Publication Data
US 2021/0044537 A1   Feb. 11, 2021

Related U.S. Application Data

(63) Continuation of application No. PCT/US2019/025643, filed on Apr. 3, 2019.
(Continued)

(51) Int. Cl.
*H04L 45/12* (2022.01)
*H04L 45/02* (2022.01)
(Continued)

(52) U.S. Cl.
CPC .............. *H04L 45/12* (2013.01); *H04L 43/08* (2013.01); *H04L 45/02* (2013.01); *H04L 45/04* (2013.01);
(Continued)

(58) Field of Classification Search
CPC ......... H04L 47/72; H04L 45/02; H04L 45/04; H04L 45/745; H04L 45/12; H04L 45/34
See application file for complete search history.

(56) References Cited

U.S. PATENT DOCUMENTS

| | | | |
|---|---|---|---|
| 5,502,816 A | 3/1996 | Gawlick et al. | |
| 7,751,405 B1 | 7/2010 | Kompella | |

(Continued)

FOREIGN PATENT DOCUMENTS

| | | |
|---|---|---|
| CN | 101036134 A | 9/2007 |
| CN | 101401083 A | 4/2009 |

(Continued)

OTHER PUBLICATIONS

Chunduri, U., "BGP Link-State extensions for NSPF ID," draft-chunduri-idr-bgp-ls-nspfid-00, Apr. 2, 2018, 7 pages.
(Continued)

*Primary Examiner* — Glenton B Burgess
*Assistant Examiner* — Jihad K Boustany
(74) *Attorney, Agent, or Firm* — Conley Rose, P.C.

(57) ABSTRACT

A method implemented by a network element (NE) in a network receiving, by the NE, an advertisement comprising preferred path route (PPR) information describing a path from an ingress NE to an egress NE in the network, the PPR information comprising a PPR identifier (PPR-ID) and an attribute associated with a resource to be reserved on the PPR, transmitting, by the NE, the advertisement comprising the PPR-ID and the attribute associated with the resource to be reserved on the PPR to another NE in the network, and updating, by the NE, a local forwarding database to include the PPR information in association with the egress NE in response to the NE being identified in the PPR information.

20 Claims, 14 Drawing Sheets

Related U.S. Application Data

(60) Provisional application No. 62/663,115, filed on Apr. 26, 2018.

(51) Int. Cl.
　　*H04L 45/00*　　　(2022.01)
　　*H04L 45/745*　　(2022.01)
　　*H04L 47/72*　　　(2022.01)
　　*H04L 43/08*　　　(2022.01)
　　*H04L 45/44*　　　(2022.01)

(52) U.S. Cl.
　　CPC ............. *H04L 45/34* (2013.01); *H04L 45/44* (2013.01); *H04L 45/745* (2013.01); *H04L 47/72* (2013.01)

(56) References Cited

U.S. PATENT DOCUMENTS

| | | |
|---|---|---|
| 8,830,826 B2 | 9/2014 | Chen |
| 9,369,371 B2 | 6/2016 | Filsfils et al. |
| 9,450,817 B1 | 9/2016 | Bahadur et al. |
| 9,660,897 B1 | 5/2017 | Gredler |
| 9,838,246 B1 | 12/2017 | Hegde et al. |
| 10,003,519 B2 | 1/2018 | Lee |
| 10,122,614 B2 | 11/2018 | Eckert et al. |
| 10,142,220 B2 | 11/2018 | Santos et al. |
| 10,178,029 B2 | 1/2019 | Levy et al. |
| 10,547,538 B2 | 1/2020 | Chen et al. |
| 11,032,197 B2 | 6/2021 | Nainar et al. |
| 2003/0005149 A1 | 1/2003 | Haas et al. |
| 2003/0014540 A1 | 1/2003 | Sultan et al. |
| 2004/0208119 A1 | 10/2004 | Christodoulou et al. |
| 2006/0117110 A1 | 6/2006 | Vasseur et al. |
| 2007/0214275 A1 | 9/2007 | Mirtorabi et al. |
| 2008/0075016 A1 | 3/2008 | Ashwood-Smith |
| 2009/0185494 A1 | 7/2009 | Li et al. |
| 2010/0220736 A1 | 9/2010 | Mohapatra et al. |
| 2011/0032945 A1 | 2/2011 | Mullooly et al. |
| 2011/0069713 A1* | 3/2011 | Mariblanca Nieves ................ H04L 45/123 370/400 |
| 2012/0243539 A1 | 9/2012 | Keesara |
| 2013/0070745 A1 | 3/2013 | Nixon et al. |
| 2013/0103739 A1* | 4/2013 | Salgueiro ................ H04L 41/22 709/203 |
| 2013/0286846 A1* | 10/2013 | Atlas ...................... H04L 47/726 370/236 |
| 2014/0379910 A1* | 12/2014 | Saxena ................... H04L 47/215 709/225 |
| 2015/0055654 A1 | 2/2015 | Song |
| 2015/0078205 A1* | 3/2015 | Stoger ...................... H04L 45/10 370/255 |
| 2015/0229618 A1 | 8/2015 | Wan et al. |
| 2015/0244607 A1 | 8/2015 | Han |
| 2015/0244628 A1* | 8/2015 | Gredler ................... H04L 45/302 370/236 |
| 2016/0099864 A1 | 4/2016 | Akiya et al. |
| 2016/0192029 A1* | 6/2016 | Bergstrom .......... H04L 65/4076 725/109 |
| 2016/0308758 A1 | 10/2016 | Li et al. |
| 2017/0012895 A1 | 1/2017 | Zhao et al. |
| 2017/0061138 A1 | 3/2017 | Lambert |
| 2017/0104668 A1 | 4/2017 | Zhang et al. |
| 2017/0187629 A1 | 6/2017 | Shalev et al. |
| 2017/0230276 A1 | 8/2017 | Ceccarelli et al. |
| 2017/0237656 A1 | 8/2017 | Gage |
| 2017/0289027 A1 | 10/2017 | Ratnasingham |
| 2017/0346718 A1 | 11/2017 | Psenak et al. |
| 2018/0102965 A1 | 4/2018 | Hari et al. |
| 2018/0351864 A1* | 12/2018 | Jeganathan ........... H04L 45/748 |
| 2019/0058657 A1 | 2/2019 | Chunduri et al. |
| 2019/0182155 A1 | 6/2019 | Chang |
| 2019/0278284 A1 | 9/2019 | Zhang et al. |
| 2019/0394115 A1 | 12/2019 | Li |
| 2020/0021515 A1* | 1/2020 | Michael ................ H04L 45/121 |
| 2020/0136960 A1 | 4/2020 | Jeuk et al. |
| 2020/0296025 A1 | 9/2020 | Wang |
| 2021/0176168 A1 | 6/2021 | Eckert et al. |

FOREIGN PATENT DOCUMENTS

| | | |
|---|---|---|
| CN | 105337785 A | 2/2016 |
| CN | 106063203 A | 10/2016 |
| CN | 106301952 A | 1/2017 |
| CN | 107579838 A | 1/2018 |
| CN | 107637031 A | 1/2018 |
| WO | 2015167479 A1 | 11/2015 |
| WO | 2017141078 A1 | 8/2017 |
| WO | 2019210769 A1 | 11/2019 |

OTHER PUBLICATIONS

Chunduri, U., Ed., et al., "Usage of Non Shortest Path Forwarding (NSPF) IDs in IS-IS," draft-ct-isis-nspfid-for-sr-paths-01, Mar. 23, 2018, 16 pages.

Chunduri, U., et al., "Usage of Non Shortest Path Forwarding (NSPF) IDs in OSPF," draft-ct-ospf-nspfid-for-sr-paths-00, Mar. 24, 2018, 14 pages.

Han, L., et al., "IPv6 in-band signaling for the support of transport with QoS," draft-han-6man-in-band-signaling-for-transport-qos-00, Oct. 11, 2017, 40 pages.

Previdi, S., et al., "IPv6 Segment Routing Header (SRH)," draft-ietf-6man-segment-routing-header-11, Mar. 28, 2018, 34 pages.

Filsfils, C., Ed., et al., "Segment Routing Architecture," draft-ietf-spring-segment-routing-15, Jan. 25, 2018, 31 pages.

Chunduri, Uma S.; U.S. Appl. No. 62/634,425; Title: "Advertising and Programming a Non-Shortest Path Forwarding Identifier in Interior Gateway Protocols"; Filing Date: Feb. 23, 2018.

Chunduri, Uma S.; U.S. Appl. No. 62/649,355; Title: "Method and Apparatus for NonShortest Path Forwarding Identifiers (NSPF ID) Distribution and Maintenance"; Filing Date: Feb. 28, 2018.

"Usage of Non Shortest Path Forwarding (NSPF) Ids in IGPs," IETF101, London, 10 pages.

Adams, C., et al., "The Simple Public-Key GSS-API Mechanism (SPKM)," RFC 2025, 45 pages.

Braden, R., Ed., et al., "Resource Reservation Protocol (RSVP)," RFC 2205, Sep. 1997, 112 pages.

Awduche, D., et al., "RSVP-TE: Extensions to RSVP for LSP Tunnels," RFC 3209, Dec. 2001, 61 pages.

Li, T., et al., "IS-IS Extensions for Traffic Engineering," RFC 5305, Oct. 2008, 17 pages.

Previdi, S., Ed., et al., "IS-IS Traffic Engineering (TE) Metric Extensions," RFC 7810, May 2016, 18 pages.

Filsfils, C., et al., "SRv6 Network Programming," Internet Draft, draft-filsfils-spring-srv6-network-programming-07, Feb. 14, 2019, 42 pages.

Previdi, S., Ed., et al., "IS-IS Extensions for Segment Routing," draft-ietf-isis-segment-routing-extensions-15, Dec. 19, 2017, 34 pages.

Dhody, D., Ed., et al., "A Yang Data Model for Path Computation Element Communications Protocol (PCEP)," draft-etf-pce-pcep-yang-06, Jan. 5, 2018, 108 pages.

Tantsura, J., et al., "Signaling MSD (Maximum SID Depth) Using IS-IS," draft-ietf-isis-segment-routing-msd-09, Jan. 10, 2018, 9 pages.

Xu, X., et al., "Signaling Entropy Label Capability and Readable Label-stack Depth Using IS-IS," draft-ietf-isis-mpls-elc-03, Jan. 3, 2018, 6 pages.

Filsfils, C., Ed., et al., "Segment Routing Architecture," draft-ietf-spring-segment-routing-14, Dec. 20, 2017, 31 pages.

Litkowski, S., et al., "YANG Data Model for Segment Routing," draft-ietf-spring-sr-yang-08, Dec. 28, 2017, 29 pages.

Hegde, S., "Traffic Accounting for MPLS Segment Routing Paths," draft-hegde-spring-traffic-accounting-for-sr-paths-01, Oct. 30, 2017, 14 pages.

(56) References Cited

OTHER PUBLICATIONS

Chunduri, U., et al., "Preferred Path Routing (PPR) in IS-IS," draft-chunduri-lsr-isis-preferred-path-routing-01, Jul. 2, 2018, 51 pages.

Qu, Y., et al., "YANG Data Model for Preferred Path Routing," draft-qct-lsr-ppr-yang-00, Jun. 27, 2018, 56 pages.

Previdi, S., Ed., et al., "IPv6 Segment Routing Header (SRH)," draft-ietf-6man-segment-routing-header-08, Jan. 20, 2018, 35 pages.

Kompella, K., et al., "The Use of Entropy Labels in MPLS Forwarding," RFC 6790, Nov. 2012, 25 pages.

Psenak, P., et al., "OSPFv2 Prefix/Link Attribute Advertisement," RFC 7684, Nov. 2015, 15 pages.

Crabbe, E., et al., "Path Computation Element Communication Protocol (PCEP) Extensions for PCE-Initiated LSP Setup in a Stateful PCE Model," RFC 8281, Dec. 2017, 20 pages.

Quinn, P., Ed., et al., "Network Service Header (NSH)," RFC 8300, Jan. 2018, 40 pages.

Filsfils, C., Ed., et al., "Segment Routing Architecture," RFC 8402, Jul. 2018, 32 pages.

Bates, et al.," Multiprotocol Extensions for BGP-4,"RFC 4760, Jan. 2007, 12 pages.

Psenak, et al., "Multi-Topology (MT) Routing in OSPF," RFC 4915, Jun. 2007, 20 pages.

Przygiena, et al., "M-ISIS: Multi Topology (MT) Routing in Intermediate System to Intermediate Systems (IS-Iss)," RFC 5120 Feb. 2008, 14 pages.

Gredler, Ed., et al., "North-Bound Distribution of Link-State and Traffic Engineering (TE) Information Using BGP," RFC 7752, Mar. 2016, 48 pages.

Atlas, A., Ed., et al., "Basic Specification for IP Fast Reroute: Loop-Free Alternates," RFC 5286, Sep. 2008, 31 pages.

Bryant, S., et al., "Remote Loop-Free Alternate (LFA) Fast Reroute (FRR)," RFC 7490, Apr. 2015, 29 pages.

Bashandy, A., et al., "Loop avoidance using Segment Routing, draft-bashandy-rtgwg-segment-routing-uloop-03," Apr. 2, 2018, 7 pages.

Bashandy, A., et al., "Topology Independent Fast Reroute using Segment Routing, draft-bashandy-rtgwg-segment-routing-ti-lfa-05," Oct. 4, 2018, 19 pages.

Sivabalan, S., et al., "PCEP Extensions for Segment Routing," draft-ietf-pce-segment-routing-11, Nov. 20, 2017, 22 pages.

Bashandy, A., et al., "Topology Independent Fast Reroute using Segment Routing," draft-bashandy-rtgwg-segment-routing-ti-lfa-04, Mar. 30, 2018, 18 pages.

Mirsky, G., et al., "Bidirectional Forwarding Detection (BFD) in Segment Routing Networks Using MPLS Dataplane," draft-mirsky-spring-bfd-05, Mar. 1, 2018, 11 pages.

Atlas, A., et al., "An Architecture for IP/LDP Fast Reroute," RFC 7812, Jun. 2016, 44 pages.

Jumar, N., Ed., et al., "Label Switched Path (LSP) Ping/Traceroute for Segment Routing (SR) IGP-Prefix and IGP-Adjacency Segment Identifiers (SIDs) with MPLS Data Planes," RFC 8287, Dec. 2017, 25 pages.

Alimi, Ed., et al., "Application-Layer Traffic Optimization (ALTO) Protocol," RFC 7285, Sep. 2014, 91 pages.

\* cited by examiner

203

| Node ID 403 | Resource Reservation Capabilities 406 |

```
     0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |Type     | Length      | RC Flags        |                    |
    +-+-+-+-+-+-+-+-+-+-+-+-+-+-+-+-+-+-+-+-+-+-+-+-+-+-+-+-+-+-+-+-+
```

453 (at position 0), 456 (at position 1), 459 (at position 3)

Reservation Capability bit-field Format
479
```
     0 1 2 3 4 5 6 7
    +-+-+-+-+-+-+-+-+
    |B|S|L|T| Reserved |E|
    +-+-+-+-+-+-+-+-+
```
473, 476, 481, 484, 487

| Node ID 403 | Resource Reservation Status 706 |

RESOURCE RESERVATION AND MAINTENANCE FOR PREFERRED PATH ROUTES IN A NETWORK

CROSS-REFERENCE TO RELATED APPLICATIONS

The present application is a continuation of International Application No. PCT/US2019/025643 filed Apr. 3, 2019, by Futurewei Technologies, Inc., and titled "Resource Reservation and Maintenance for Preferred Path Routes in a Network," which claims the benefit of U.S. Provisional Patent Application No. 62/663,115 filed Apr. 26, 2018 by Uma S. Chunduri, et al., and entitled "Resource Reservations and Maintenance For Preferred Paths In The Network Through Routing Protocols," which are incorporated herein by reference as if reproduced in its entirety.

FIELD OF INVENTION

The present disclosure pertains to the field of preferred path routing. In particular, the present disclosure relates to advertising resources that should be reserved along a preferred path route (PPR) and monitoring usage statistics of the resources that are reserved on the PPR.

BACKGROUND

In a network implementing source routing, a controller that has knowledge of a complete topology of the underlying network and can program an ingress node of the network with a custom path that certain traffic has to travel to reach a destination. This custom path may not necessarily be the shortest path between the ingress node and egress node. An ingress node in the network may use a separate flow classification technique ((e.g., a source and/or destination addresses or transport port numbers) to associate certain traffic flow with a custom path.

In a network implementing segment routing (SR), packets are steered through the network using segment identifiers (SIDs) that uniquely identify segments in the network. A segment may include one or more nodes, interfaces, and links between two nodes in the network. The SIDs are typically carried in the header of the packet.

Currently there are two data planes that use segment routing to provision custom paths in a network—Segment Routing (SR) Multi-Protocol Label Switching (MPLS) (SR-MPLS) and SR-Internet Protocol (IP) Version 6 (IPv6) (SR-IPv6). In SR-MPLS, each segment is encoded as a label, and an ordered list of segments are encoded as a stack of labels in the header of the packet. Similarly, in SR-IPv6, each segment is encoded as an IPv6 address within a segment routing header (SRH).

SUMMARY

According to a first aspect of the present disclosure, there is provided a method implemented by a network element (NE) in a network, comprising receiving, by the NE, an advertisement comprising preferred path route (PPR) information describing a path from an ingress NE to an egress NE in the network, the PPR information comprising a PPR identifier (PPR-ID) and an attribute associated with a resource to be reserved on the PPR, transmitting, by the NE, the advertisement comprising the PPR-ID and the attribute associated with the resource to be reserved on the PPR to another NE in the network, and updating, by the NE, a local forwarding database to include the PPR information in association with the egress NE in response to the NE being identified in the PPR information.

In a first implementation of the method according to the first aspect, the attribute includes at least one of a bandwidth required to transmit a data packet along the PPR, a burst size permitted to be transmitted along the PPR, a bounded latency permitted to occur on an NE along the PPR, or a lifetime indicating a time period during which the resource is to be reserved on each NE and/or link of the PPR.

In a second implementation of the method according to the first aspect or any preceding implementation of the first aspect, the method further comprises deleting, by the NE, the PPR information from the forwarding database in response to determining that a state refresh including the PPR information has not been received by the NE within the time period during which the resource is reserved, and removing, by the NE, a reservation of the resource on one or more of the NEs or links on the PPR in response to determining that the state refresh including the PPR information has not been received by the NE within the lifetime.

In a third implementation of the method according to the first aspect or any preceding implementation of the first aspect, the method further comprises receiving a state refresh from at least one of a central entity of the network or a second NE in the network, wherein the state refresh comprises the PPR information.

In a fourth implementation of the method according to the first aspect or any preceding implementation of the first aspect, the method further comprises receiving, by the NE, a modification of the attribute associated with the resource reserved on the PPR from at least one of a central entity of the network or a second NE in the network, and updating, by the NE, the local forwarding database based on the modification of the attribute received.

In a fifth implementation of the method according to the first aspect or any preceding implementation of the first aspect, the method further comprises determining, by the NE, that at least one NE or link on the PPR fails to satisfy the attribute defined by the PPR information.

In a sixth implementation of the method according to the first aspect or any preceding implementation of the first aspect, the method further comprises transmitting a node status to at least one other NE in the network using an underlying Interior Gateway Protocol (IGP) of the network, wherein the node status indicates whether the resource has been successfully reserved based on the attribute included in the PPR information.

In a seventh implementation of the method according to the first aspect or any preceding implementation of the first aspect, the method further comprising transmitting a node status to a central entity of the network, wherein the reservation status indicates whether the resource has been successfully reserved based on the attribute included in the PPR information.

In an eighth implementation of the method according to the first aspect or any preceding implementation of the first aspect, the method further comprising periodically collecting, by the NE, usage statistics describing network characteristics along the PPR after reserving the resource for the PPR based on the PPR information.

In a ninth implementation of the method according to the first aspect or any preceding implementation of the first aspect, the method further comprising transmitting, by the NE, the usage statistics to at least one other NE in the network using an underlying Interior Gateway Protocol (IGP) of the network.

In a tenth implementation of the method according to the first aspect or any preceding implementation of the first aspect, the method further comprising transmitting, by the NE, the usage statistics directly to a central entity of the network.

In an eleventh implementation of the method according to the first aspect or any preceding implementation of the first aspect, wherein the usage statistics comprises at least one of a queue delay that occurs as a plurality of data packets are transmitted from the NE to the other NE on the PPR or bandwidth statistics regarding at least one link coupled to the NE.

In a twelfth implementation of the method according to the first aspect or any preceding implementation of the first aspect, wherein the bandwidth statistics comprises at least one of a utilized bandwidth, and unutilized bandwidth, or a bandwidth violation.

In a thirteenth implementation of the method according to the first aspect or any preceding implementation of the first aspect, wherein the PPR is a shortest path between the source and the destination, and wherein the PPR information only includes the attribute associated with the resource to be reserved on the PPR to another NE in the network.

In a fourteenth implementation of the method according to the first aspect or any preceding implementation of the first aspect, wherein the PPR is determined based on a network characteristic requested by the source.

In a fifteenth implementation of the method according to the first aspect or any preceding implementation of the first aspect, wherein the advertisement is received from at least one of a second NE in the network or a central entity of the network.

In a sixteenth implementation of the method according to the first aspect or any preceding implementation of the first aspect, wherein the PPR-ID is at least one of a Multi-Protocol Label Switching (MPLS) label, a segment identifier (SID), an Internet Protocol (IP) version 4 (IPv4) address, or an IP version 6 (IPv6) address.

According to a second aspect of the present disclosure, there is provided a method implemented by a first NE in a network. The method comprises receiving, by the first NE, an advertisement comprising preferred path route (PPR) information from a second NE in the network, the PPR information describing a path from an ingress NE to an egress NE in the network, the PPR information comprising a PPR identifier (PPR-ID) and an attribute associated with a resource to be reserved on the PPR, updating, by the first NE, the local forwarding database to include the PPR information in association with the egress NE in response to the first NE being identified in the PPR information, provisioning, by the first NE, the PPR according to the attribute associated with the resource to be reserved on the PPR, updating, by the first NE, a node status associated with the first NE in response to provisioning the PPR according to the attribute, and transmitting, by the first NE, the node status to a central entity of the network.

According to a third aspect of the present disclosure, there is provided an NE in a network. The NE comprises a receiver configured to receive an advertisement comprising preferred path route (PPR) information describing a path from an ingress NE to an egress NE in the network, the PPR information comprising a PPR identifier (PPR-ID) and an attribute associated with a resource to be reserved on the PPR, a transmitter coupled to the processor and configured to transmit the advertisement comprising the PPR-ID and the attribute associated with the resource to be reserved on the PPR to another NE in the network, and a processor coupled to the receiver and configured to update a local forwarding database to include the PPR information in association with the egress NE.

According to a fourth aspect of the present disclosure, there is provided a non-transitory medium configured to store a computer program product comprising computer executable instructions that, when executed by a processor of a network element (NE) implemented in a network, cause the processor to receive an advertisement comprising preferred path route (PPR) information describing a path from an ingress NE to an egress NE in the network, the PPR information comprising a PPR identifier (PPR-ID) and an attribute associated with a resource to be reserved on the PPR, transmit the advertisement comprising the PPR-ID and the attribute associated with the resource to be reserved on the PPR to another NE in the network, and update a local forwarding database to include the PPR information in association with the destination in response to the NE being identified in the PPR information.

According to a fifth aspect of the present disclosure, there is provided an apparatus comprising a means for receiving an advertisement comprising preferred path route (PPR) information describing a path from an ingress NE to an egress NE in the network, the PPR information comprising a PPR identifier (PPR-ID) and an attribute associated with a resource to be reserved on the PPR, a means for transmitting the advertisement comprising the PPR-ID and the attribute associated with the resource to be reserved on the PPR to another NE in the network, and a means for updating a local forwarding database to include the PPR information in association with the destination.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 4A-C are diagrams illustrating an example of a node resource capability sent by an NE in the network, and fields within the node resource capability, according to various embodiments of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Source routing mechanisms, such as segment routing, have been defined for MPLS and IPv6 data planes. However, existing source routing mechanisms do not enable paths to be provisioned based on traffic engineering (TE) parameters such that the provisioned paths satisfy certain Quality of Service (QoS) parameters. In addition, existing path provisioning protocols do not include mechanisms by which to monitor the usage of various resources on the provisioned path such that the path can be re-provisioned if the path no longer satisfies the QoS parameters.

Disclosed herein are various embodiments directed to reserving resources on a Preferred Path Route (PPR) (also referred to herein as a "preferred path" or a "PPR path") between a source and a destination based on attributes defining a TE parameter or a network characteristic of the PPR. In an embodiment, a network element (NE) in a network sends an advertisement that includes PPR information describing a PPR to other NEs in the network. The PPR information includes a PPR-identifier (ID) identifying the PPR and one or more attributes related to the resource that should be reserved on the PPR. After the resources have been successfully reserved on the PPR, NEs on the PPR monitor the usage of the resources on the PPR to collect usage statistics describing used or unused resources on the PPR. The NEs on the PPR send the usage statistics to a central entity of the PPR. In this way, the embodiments disclosed herein enable a mechanism to provision PPRs that satisfy QoS parameters based on attributes specified for the PPRs and a mechanism to monitor the resources reserved on the PPRs.

Figure 1:
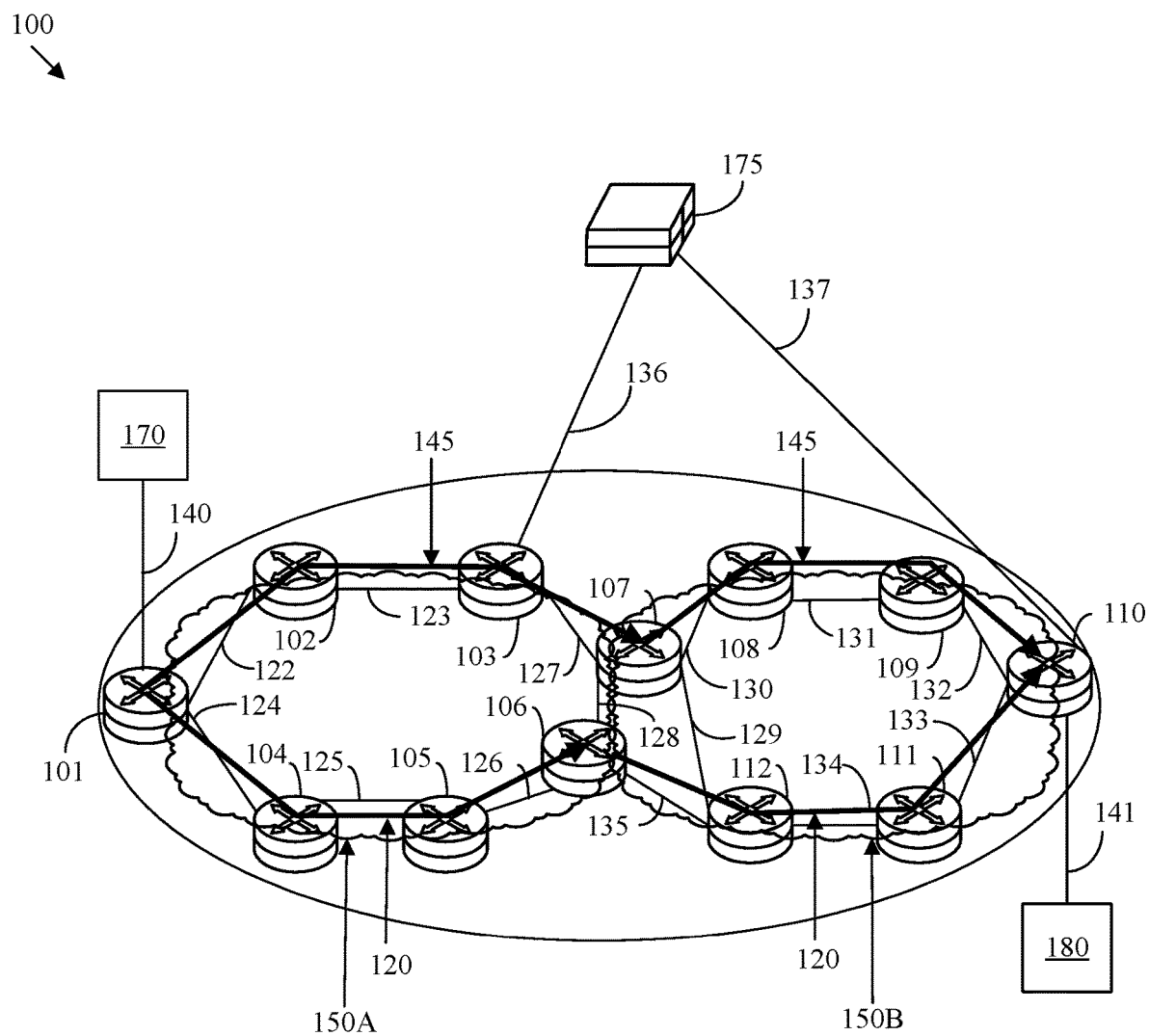
FIG. 1 is a diagram illustrating a network configured to implement preferred path routing according to various embodiments of the disclosure.

FIG. 1 is a diagram illustrating a network 100 (also referred to herein as a "domain or "subnetwork") configured to implement preferred path routing according to various embodiments of the disclosure. The network 100 comprises a source 170, a destination 180, a central entity 175 (also referred to herein as a "controller"), two areas 150A and 150B, and central entity-to-area links 136-137. The source 170 is connected to network 100 via a source-to-domain link 140, and the destination is connected to network 100 via a destination-to-domain link 141.

In an embodiment, the central entity 175 may be a network or domain controller that maintains a topology of the network 100 to craft paths (both shortest paths 145 and PPRs 120) between edge NEs 101-112 in the network 100, as will be further described below. In an embodiment, the central entity is substantially similar to a Path Computation Element (PCE), which is further described in Internet Engineering Task Force (IETF) Request for Comments (RFC) 8281, entitled "Path Computation Element Communication Protocol (PCEP) Extensions for PCE-Initiated LSP Setup in a Stateful PCE Model," by E. Crabbe, dated December 2017. In an embodiment, the central entity 175 may be substantially similar to a Software Defined Network Controller (SDNC), which is further described in the IETF RFC 8402 entitled "Segment Routing Architecture," by C. Filsfils, dated July 2018. In an embodiment, the central entity 175 may be substantially similar to an Application Layer Traffic Optimization (ALTO) server, which is further described in the IETF RFC 7285, entitled "Application Layer Traffic Optimization (ALTO) Protocol," by R. Alimi, dated September 2014.

Areas 150A-B are subnetworks within the network 100 that may be associated with a specific geographic area or building. Each of areas 150A-B may be operated by a different operator or service provider. As shown by FIG. 1, area 150A comprises elements 101-107 and 122-128 (e.g., NEs 101-107 interconnected by links 122-128). Area 150B comprises elements 106-112 and 128-135 (e.g., NEs 106-112 interconnected by links 128-135). As shown by FIG. 1, areas 150A-B both share two NEs 106-107 and link 128. NEs 106-107 and link 128 may be configured to operate within both areas 150A-B using a packet forwarding protocol implemented by both areas 150A-B.

In an embodiment, NEs 101-112 (also referred to herein as "nodes") may be a topological devices (or physical devices) such as a router, a bridge, a network switch, or a logical device configured to perform switching and routing using the preferred path routing mechanisms disclosed herein. In an embodiment, one or more of the NEs 101-112 may be non-topological NEs such as, for example, a function, context, service, or a virtual machine.

In an embodiment, NEs 101-112 may be headend nodes or edge nodes positioned at an edge of the network 100. For example, NE 101 may be an ingress node at which packets are received (either from a source or another NE from another network/domain), and NE 110 may be an egress node from which traffic is transmitted (either to a destination or another NE in another network/domain). While NEs 101-112 are shown in FIG. 1 as headend nodes, it should be appreciated that NEs 101-112 may otherwise be an intermediate node or any other type of NE. Although only twelve NEs 101-112 are shown in FIG. 1, it should be appreciated that the network 100 shown in FIG. 1 may include any number of NEs.

In an embodiment, the central entity 175 and NEs 101-112 are configured to implement various packet forwarding protocols, such as, but not limited to, Multi-Protocol Label Switching (MPLS), Segment Routing-MPLS (SR-MPLS), Internet Protocol (IP) Version 4 (IPv4), IP Version 6 (IPv6), Next Generation Explicit Routing (NGER), or Big Packet Protocol. In an embodiment, each area 150A and 150B may be configured to implement a different packet forwarding protocol. For example, NEs 101-107 in area 150A are configured to implement MPLS, while NEs 106-112 in area 150B are configured to implement IPv6. In such an embodiment, NEs 106 and 107, which are shared between the two areas 150A-B, may be configured to implement both packet forwarding protocols to ensure proper data transmission between areas 150A-B.

The links 122-135 may be wired or wireless links or interfaces interconnecting the NEs 101-112 together. The central entity-to-area links 136-137 are also wired or wireless links or interfaces interconnecting at least one of the NEs 101-112 within an area 150A-B to the central entity 175. As described above, the source 170 is connected to network 100 via a source-to-domain link 140, and the destination is connected to network 100 via a destination-to-domain link 141. The source-to-domain link 140 and the destination-to-domain link 141 may be wired or wireless links or interfaces interconnecting each of the source 170 and the destination 180 to an NE 101 and NE 110, respectively, of the network 100.

In operation, the central entity 175 is configured to determine one or more shortest paths 145 between two edge NEs 101-112 in the network 100 and one or more PPRs 120 between two edge NEs 101-112 in the network 100. A shortest path 145 refers to a path between two NEs 101 and 110 (ingress NE 101 and egress NE 110) or between a source 170 and destination 180 that is determined based on a metric, such as, for example, a cost or weight associated with each link on the path, a number of NEs on the path, a number of links on the path, etc. In an embodiment, a shortest path 145 may be computed for a destination using a Dijkstra's Shortest Path First (SPF) algorithm.

A PPR 120 (also referred to herein as a Non-Shortest Path (NSP)) refers to a custom path or any other path that is determined based on an application or server request for a path between an ingress NE 101 and an egress NE 110 or between a source 170 and destination 180. In an embodiment, the PPR 120 deviates from the shortest path 145. However, the PPR 120 may also be the same as the shortest path 145 in some circumstances.

In an embodiment, the central entity 175 is configured to determine the PPR 120 based on attributes specified for the PPR 120. As will be further described below, an attribute specified for the PPR 120 may be one or more TE parameters, network characteristics, or service requirements that are associated with a resource to be reserved on the PPR 120. In an embodiment, the attribute may include a bandwidth requirement, a maximum burst size, a latency requirement, a minimum jitter, a minimum error rate, a required throughput, etc. In an embodiment, reserving resources on the NEs 101-112 and links 122-135 of the PPR 120 according to the attributes specified for the PPR 120 ensures that data packets being transmitted along the PPR 120 satisfy a certain QoS parameter set by the source 170 of the PPR 120 or an operator of the network 100.

In an embodiment, a source 170, or an ingress NE 101, transmits a request to the central entity 175 to compute a PPR 120 between the source 170 and the destination 180 (or between the ingress NE 101 and the egress NE 110) according to a particular attribute. In another embodiment, the attributes for a particular PPR 120 may be preconfigured at the central entity 175 by an operator or service provider of the network 100. In another embodiment, the central entity 175 is configured to determine the PPR 120 according to the attribute requested.

The PPRs 120 and the shortest paths 145 may each comprise a sequential ordering of one or more elements 101-112 and 122-135 (e.g., NEs 101-112 and links 122-135) in the network 100. As shown in FIG. 1, the shortest path 145 between ingress NE 101 and egress NE 110 includes the following elements: NE 101, link 122, NE 102, link 123, NE 103, link 127, NE 107, link 130, NE 108, link 131, NE 109, link 132, and NE 110. As described above, the shortest path 145 between ingress NE 101 and egress NE 110 is based on metrics of each of the elements 101-112 and 122-135 in the network 100.

In contrast, the PPR 120 between ingress NE 101 and egress NE 110 includes the following elements: NE 101, link 124, NE 104, link 125, NE 105, link 126, NE 106, link 135, NE 112, link 134, NE 111, link 133, and NE 110. In an embodiment, the central entity 175 determines the elements on the PPR 120 based on an attribute, such as, bandwidth, latency, or burst size, of each of one or more of the elements (NE 101, link 124, NE 104, link 125, NE 105, link 126, NE 106, link 135, NE 112, link 134, NE 111, link 133, and NE 110) on PPR 120.

After the central entity 175 determines the PPR 120 based on the attribute, the central entity 175 transmits PPR information describing the PPR 120 to a headend or ingress NE 101-112 in each area 150A-B of network 100. For example, the central entity 175 transmits PPR information describing the PPR 120 implemented in area 150A to NE 103 via central entity-to-area link 136. Similarly, the central entity 175 transmits PPR information describing the PPR 120 implemented in area 150B to NE 110 via link 137.

In an embodiment, the PPR information includes information that describes the PPR 120. The PPR information may include, for example, a PPR-ID identifying the PPR 120. In an embodiment, the PPR-ID includes a single label, address, or ID identifying the PPR 120. For example, when the network 100 implements SR-MPLS, the PPR-ID may be an MPLS label or an SID identifying a PPR. When the network 100 implements IPv6, the PPR-ID may be an IPv6 SID identifying a PPR. When the network 100 implements IPv4, the PPR-ID may be an IPv4 address or prefix identifying a PPR. Similarly, when the network 100 implements IPv6, the PPR-ID may be an IPv6 address or prefix identifying a PPR.

The PPR information also includes multiple PPR-path description elements (PDEs) describing one or more elements (NE 101, link 124, NE 104, link 125, NE 105, link 126, NE 106, link 135, NE 112, link 134, NE 111, link 133, and NE 110) or segments including one or more of the elements on the PPR 120. In an embodiment, each of the PPR-PDEs includes a label, address, or identifier of one or more of the elements 101, 124, 104, 125, 105, 126, 106, 135, 112, 134, 111, 133, and 110 or segments including one or more of the elements on the PPR 120. In an embodiment, the PPR-PDEs include a sequential ordering of MPLS labels, IPV6 addresses, or IPv4 addresses that specify the actual path (e.g., one or more of the elements 101, 124, 104, 125, 105, 126, 106, 135, 112, 134, 111, 133, and 110 on the PPR 120) toward a destination address of the egress NE 110 or the destination 180 (also referred to herein as a "prefix"). In an embodiment, each of the PPR-PDEs may also define whether the element being described is a topological NE or a non-topological NE.

In various embodiments, two types of PPRs 120 may be described by the PPR-PDEs, a strict PPR 120 and a loose PPR 120. In a strict PPR 120, every single NE (NE 101, NE 104, NE 105, NE 106, NE 112, NE 111, and NE 110) along the PPR 120 is specified or described in its own PPR-PDE. In a loose PPR 120, certain elements 101, 124, 104, 125, 105, 126, 106, 135, 112, 134, 111, 133, and 110 (also referred to herein as "hops") along a PPR 120 may be skipped such that only a subset of the elements 101, 124, 104, 125, 105, 126, 106, 135, 112, 134, 111, 133, and 110 along a PPR 120 is specified or described in its own PPR-PDE. When loose PPRs 120 are described by the PPR-PDEs, the NEs along the path use shortest path routing in between elements that are not explicitly specified in a PPR-PDE (i.e., to reach the next topological PDE of the loose PPR 120).

The PPR information may include several other descriptive elements, which are further described in Patent Cooperation Treaty (PCT) Application No. PCT/US2019/015419, entitled "Advertising and Programming Preferred Path Routes using Interior Gateway Protocols," by Uma Chunduri, et. al., and filed on Jan. 28, 2019 (hereinafter referred to as the "PPR Patent"). For example, the PPR information may include a PPR type, defining an encoding scheme used to encode the PPR-ID. For example, when the PPR-ID is an IPv4 address, then the PPR type is a value indicating that the PPR-ID is an IPv4 address. Similarly, when the PPR-ID is an IPv6 address or an MPLS label, then the PPR type is a value indicating that the PPR-ID is an IPv6 address or an MPLS label. The PPR information may also include various flags. For example, one bit may indicate whether all the NEs in the network 100 downloads the PPR information or only a subset of the NEs identified in the PPR-PDEs downloads the PPR information.

In an embodiment, the PPR information may also include one or more attributes associated with a resource to be reserved on the PPR 120. As described above, the attribute refers to a TE parameter network characteristic that should be satisfied when reserving a resource on the PPR 120. Examples of attributes specified for a PPR 120 may include bandwidth, burst size, latency, and lifetime, which will be further described below with reference to FIGS. 5A-B and 6A-D.

After receiving the PPR information, NEs 103 and 110 first determine whether the NEs 103 and 110 are identified in a PPR-PDE of the PPR information. When a PPR-PDE does not identify the NE 103 or 110, NEs 103 and 110 ignore the PPR information. In contrast, when a PPR-PDE identifies the NE 103 or 110, the NE 103 or 110 updates a local forwarding database to include an entry including the PPR information for a destination address corresponding to the egress NE 110 or the destination 180.

In an embodiment, the local forwarding database is updated by adding another entry for a particular destination ID or address of the egress NE 110 or the destination 180. The new entry includes at least one of the PPR-ID, each of the PPR-PDEs corresponding the PPR-ID, an ID or address of the next element 101, 124, 104, 125, 105, 126, 106, 135, 112, 134, 111, 133, or 110 on the PPR 120 to which to forward a data packet, and the one or more attributes specified for the PPR 120. In another embodiment, NEs 103 and 110 are configured to update the local forwarding database to include the PPR information relative to a destination address of the egress NE 110 or the destination 180 regardless of whether the NE 103 or 110 is identified in a PPR-PDE of the PPR information.

After receiving the PPR information and updating a local forwarding database, the NEs 103 and 110 send (or flood) an advertisement including the PPR information to all of the other NEs 101-112 in the respective area 150A-B of network 100 using the underlying Interior Gateway Protocol (IGP) of the respective area 150A-B. The advertisement including the PPR information may be encoded and flooded through the respective area 150A-B using an IGP, such as, for example, Open Shortest Path First (OSPF) Version 2 (OSPFv2), OSPF Version 3 (OSPFv3), Intermediate System-Intermediate System (IS-IS), or direct SDN. For example, after receiving the PPR information, the NE 103 transmits (or floods) the PPR information to NEs 101-102 and 104-107 in area 150A according to the IGP implemented by area 150A. Similarly, after receiving the PPR information, NE 110 transmits (or floods) the PPR information to NEs 106-109 and 111-112 in area 150B according to the IGP implemented by area 150B.

In an embodiment, each of the receiving NEs 101-102, 104-107, 106-109, and 111-112 determines whether the receiving NE 101-102, 104-107, 106-109, or 111-112 is identified in a PPR-PDE of the PPR information. In an embodiment, when a PPR-PDE identifies the receiving NE 101-102, 104-107, 106-109, or 111-112, the receiving NE 101-102, 104-107, 106-109, or 111-112 updates a local forwarding database to include an entry including the PPR information for a destination address corresponding to the egress NE 110 or the destination 180. In this embodiment, when a PPR-PDE does not identify the receiving NE 101-102, 104-107, 106-109, or 111-112, the receiving NE 101-102, 104-107, 106-109, or 111-112 ignores the PPR information. In another embodiment, each of the receiving NEs 101-102, 104-107, 106-109, and 111-112 updates a local forwarding database to include an entry including the PPR information regardless of whether the NE is identified in a PPR-PDE.

The embodiments disclosed herein are directed to advertising and programming one or more attributes defining network characteristics related to a resource to be reserved on the PPR 120 along with the basic PPR information (e.g., PPR-ID and PPR-PDEs). As the NEs 101-112 receive the PPR information including the PPR-ID, PPR-PDEs, and the attributes, the NEs 101-112 update the local forwarding databases and thereby become programmed to construct the PPR 120 based on the attributes defined by the PPR information. In this way, the PPR 120 is constructed to ensure that the PPR 120 satisfies QoS parameters defined using the attributes included in the PPR information.

In an embodiment, preferred path routing is extended to indicate the resources (e.g., attributes) to be reserved along the PPR. The resources indicated are not only for providing a committed bandwidth or deterministic latency, but also for assuring an overall service level guarantee on the network 100. In an embodiment, reservations are included in the PPR information in terms of required resources (bandwidth), traffic characteristics (burst size), and service level parameters (expected maximum latency at each hop) based on the capabilities of each element on the PPR 120.

Figure 2:
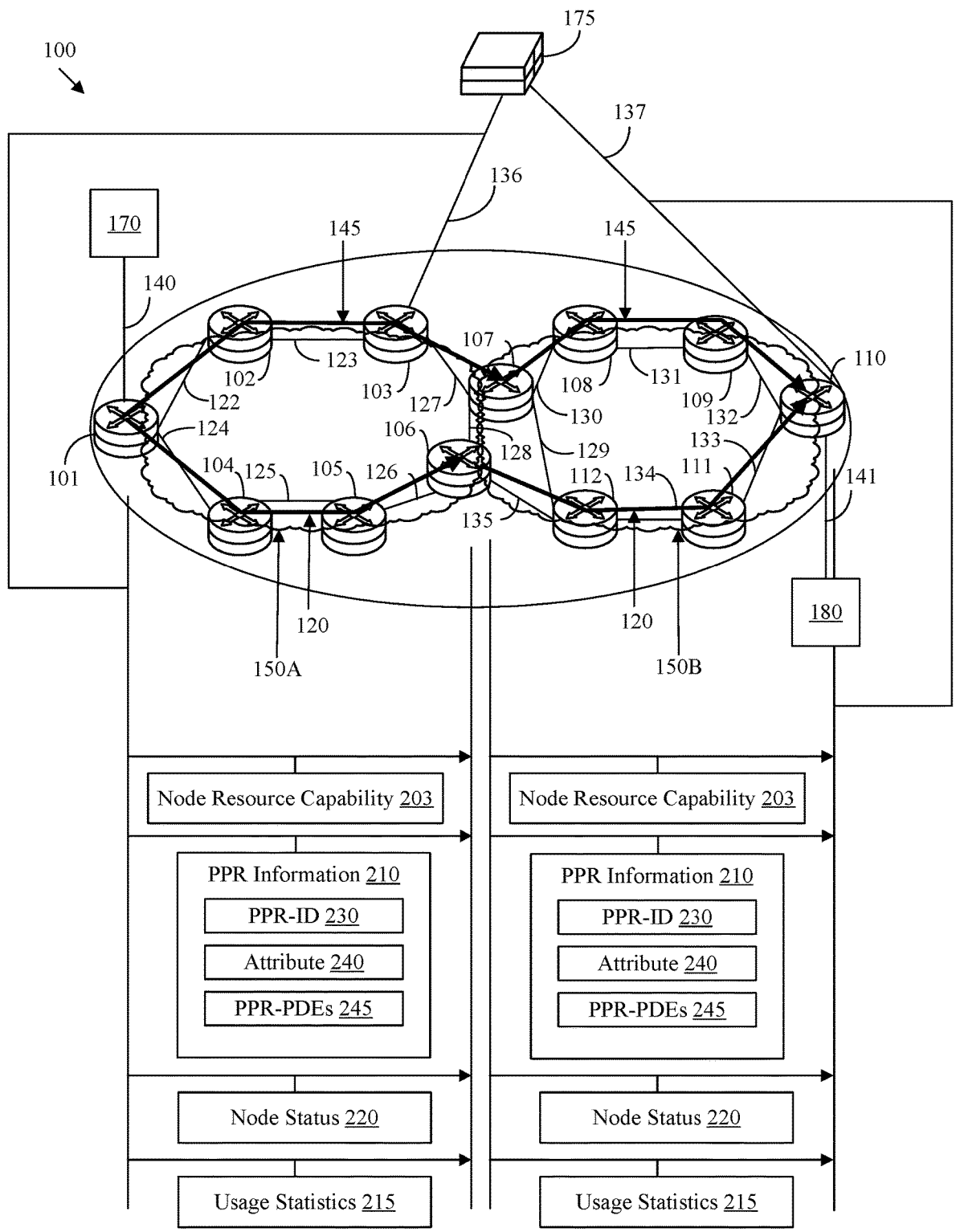
FIG. 2 is a diagram illustrating the network including NEs configured to implement resource reservation and maintenance according to various embodiments of the disclosure.

FIG. 2 is a diagram illustrating the network 100 configured to implement preferred path routing according to various embodiments of the disclosure. As shown by FIG. 2, the NEs 101-112 within the areas 150A-B of the network 100 exchange data with another to reserve resources along a PPR 120 and monitor the resources along the PPR 120. The data that can be exchanged includes a node resource capability 203, PPR information 210, a node status 220, and usage statistics 215. It should be appreciated that other data relevant to the PPR 120 may be exchanged among NEs 101-112 within the areas 150A-B of the network 100 for the purpose of reserving and monitoring resources along the PPR 120.

First, each NE 101-112 within the network 100 advertises a node resource capability 203 to all of the other NEs 101-112 within a respective area 150A-B to indicate that the NE 101-112 is located using the underlying IGP. For example, NE 101 sends a node resource capability 203 to NEs 102-107 in area 150A, and NE 106 sends a node resource capability 203 to NEs 107-112 in area 150B. In an embodiment, the node resource capability 203 is flooded to other NEs 101-112 in the network 100 before the PPR information 210 is flooded to other NEs 101-112 in the network 100.

In an embodiment, the node resource capability 203 is sent to the central entity 175 via central entity-to-area links 136-137 periodically or through any other offline mechanism. For example, supposing that NE 103 is a Border Gateway Protocol (BGP) Link State (BGP-LS) speaker, NE 103 may transmit the node resource capability 203 to the central entity 175. In an embodiment, the node resource capability 203 is encoded according to BGP-LS Prefix Network Layer Reachability Information (NLRI) when the node resource capability 203 is transmitted to the central entity 175.

A node resource capability 203 is a message sent by each NE 101-112 within a network 100 that indicates various capabilities of the NE 101-112 sending the node resource capability 203. In an embodiment, the node resource capability 203 is provisioned by a central entity 175 and flooded to other NEs 101-112 in the network 100 before the PPR information 210 is flooded to other NEs 101-112 in the network 100.

The node resource capability 203 indicates various different capabilities of, or features supported by, the NE 101-112 sending the node resource capability 203. In an embodiment, the node resource capability 203 indicates whether the NE 101-112 sending the node resource capability 203 is capable of implementing preferred path routing. In an embodiment, the node resource capability 203 indicates one or more attributes that are supported by sending the node resource capability 203. For example, the node resource capability 203 indicates whether the NE 101-112 sending the node resource capability 203 is capable of reserving a resource on the PPR 120 according to one or more different attributes. In an embodiment, the node resource capability 203 indicates whether the NE 101-112 sending the node resource capability 203 is capable of monitoring usage statistics 215 related to the resources reserved for the PPR 120.

In an embodiment, the node resource capability 203 includes one or more flags indicating whether the NE 101-112 sending the node resource capability 203 is capable of implementing preferred path routing. The node resource capability 203 also includes one or more flags indicating each of the attributes that the NE 101-112 is capable of supporting to reserve a resource on a PPR 120. The node resource capability 203 also includes one or more flags indicating each of the usage statistics that NE 101-112 is capable of monitoring.

In an embodiment, the node resource capability 203 is a new message defined by the preferred path routing protocol. In another embodiment, the node resource capability 203 is a sub Type-Length-Value (TLV) within a body of an IS-IS capable TLV, as further described in IETF RFC 7981, entitled "IS-IS Extension for Advertising Router Information," by L. Ginsberg, dated October 2016. Additional detail regarding the node resource capability 203 is further described below with reference to FIGS. 4A-C.

Second, one or more NEs 101-112 within the network 100 may transmit usage statistics 215 to the central entity 175 periodically or through any other offline mechanism such as gRPC, KAFKA or through streaming telemetry.

After receiving the PPR information 210 from the central entity 175 or locally provisioned by the operator at one or more NEs 101-112 advertises the PPR information 210 describing PPR 120 to all of the other NEs 101-112 within a respective area 150A-B that the NE 101-112 is located using the underlying IGP. In an embodiment, the PPR information 210 may be included with an advertisement or a PPR-TLV, as described in the PPR Patent. For example, assuming that NE 103 receives the PPR information 210 describing the PPR 120 from the central entity 175 (or otherwise an external entity or operator of the network 100), the NE 103 transmits the PPR information 210 to the other NEs 101-102 and 104-107 in area 150A of the network 100. Similarly, assuming that NE 110 receives the PPR information 210 describing the PPR 120 from the central entity 175 (or otherwise an external entity or operator of the network 100), the NE 103 transmits the PPR information 210 to the other NEs 106-109 and 111-112 in area 150B of the network 100.

As shown in FIG. 2 and described above, the PPR information 210 may include information describing the PPR 120, such as, for example, the PPR-ID 230 identifying the PPR 120. The PPR information 210 may also include one or more PPR-PDEs 245 describing one or more elements on the PPR 120. Each PPR-PDE 245 may include an address, label, or ID of an element on the PPR 120. The PPR information 210 may also include one or more attributes 240 associated with a resource to be reserved on the PPR 120. As described above, the PPR-ID 230 is a label, address, or ID that uniquely identifies the PPR 120, and the attributes 240 refer to network characteristics or TE parameters by which a certain resource on the PPR 120 is reserved. In an embodiment, the attributes 240 are enforced by one or more elements 101, 124, 104, 125, 105, 126, 106, 135, 112, 134, 111, 133, and 110 on the PPR 120 to ensure that the PPR 120 satisfies certain QoS parameters.

In an embodiment, the attributes 240 specify a bandwidth, a burst size, a per-hop queueing latency, or a lifetime of the PPR 120. For example, the attributes 240 for a PPR 120 may specify a minimum bandwidth or a maximum bandwidth required to transmit a data packet along a link 122-135 of the PPR 120. The attributes 240 for a PPR 120 may specify a required or maximum burst size of a burst transmitted along a link 122-126 and 133-135 of the PPR 120. The attributes 240 for a PPR 120 may specify a per-hop queuing latency, which indicates a bounded latency for each NE 101, 104, 105, 106, 112, 111, 110 or hop on the PPR 120. The attributes 240 may also specify a lifetime of the reservations made for the PPR 120 such that the reservations are torn down upon expiration of the lifetime, unless the NE 101, 104, 105, 106, 112, 111, 110 receives a state refresh of the PPR 120, which will be further described below. Additional details and examples of the attributes 240 are further described below with regard to FIGS. 5A-B and 6A-D. Although only these four examples of attributes 240 are described herein, it should be appreciated that attributes 240 include any other TE parameter or network characteristic that may be used to provide a certain QoS to clients transmitting and receiving data packets along the PPR 120.

In an embodiment, upon receiving the PPR information 210 from other NEs 101-112 in the network 100, the receiving NEs 101-112 are configured to program the PPR 120 according to the PPR information 210. Programming the PPR 120 according to the PPR information 210 includes updating a local forwarding database stored at the NE 101-112 to include the PPR information 210 in association with a destination address corresponding to the egress NE 110 of the PPR 120 or the destination 180. In an embodiment, the NE 101-112 updates the local forwarding database to include the attributes 240 along with the PPR-ID 230 and the PPR-PDEs specified by the PPR information 210. As described above, in one embodiment, the local forwarding database is updated only when the PPR-PDEs include the NE 101-112 that received the PPR information 210, and in another embodiment, the local forwarding database is updated regardless of whether the PPR-PDEs include the NE 101-112 received the PPR information 210.

After updating the local forwarding database based on the received PPR information 210, each of the NEs 101-112 transmits (or floods) a node status 220 to the other NEs 101-112 in a respective area 150A-B of the network 100 using the underlying IGP. For example, after updating the local forwarding database to include the PPR information 210, the NE 103 transmits a node status 220 to NEs 101-102 and 104-107 within area 150A. Similarly, after updating the local forwarding database to include the PPR information 210, the NE 110 transmits a node status 220 to NEs 106-109 and 111-112 within area 150B.

A node status 220 indicates whether a resource for the PPR 120 has been successfully reserved according to the attribute 240 included in the PPR information 210. In an embodiment, the node status 220 indicates a successful reservation of the resource for the PPR 120 when the local forwarding database of the NE 101-112 sending the node status 220 has been successfully updated to include the PPR information 210, including the attribute 240. In an embodiment, the node status 220 indicates a failure to reserve one or more resources for the PPR 120 when the local forwarding database of the NE 101-112 sending the node status 220 has not been successfully updated to include the PPR information 210, including the attribute 240. Additional details regarding the node status 220 are further described below with regard to FIGS. 7A-D.

After updating the local forwarding database and sending the node status 220, data packets may be forwarded along the PPR 120 in the data plane. As further described in the PPR Patent, only data packets that include the PPR-ID 230 are forwarded along the PPR 120. For example, assuming NE 101 receives a data packet with a PPR-ID 230 in a header of the data packet, the NE 101 performs a lookup at the local forwarding database using the PPR-ID 230 to determine a next hop (e.g., next element 101, 124, 104, 125, 105, 126, 106, 135, 112, 134, 111, 133, and 110 or next segment). In an embodiment, the forwarding database includes entries corresponding to destination addresses and PPR-IDs 230 indicating the next hop or element toward which to forward a data packet. The lookup may be performed at the local database by searching the forwarding database for the entry corresponding to the destination address and PPR-ID 230 included in the data packet. The data packet is then forwarded toward the next hop based on the PPR-PDEs stored in association with the PPR-ID 230 in the entry of the forwarding database.

In an embodiment, the NE 101 is also configured to perform the lookup at the local forwarding database to determine an attribute 240 associated with a resource reserved for this PPR 120 and then determines whether the path to the next hop on the PPR 120 satisfies the attribute 240. When the determined next hop on the PPR 120 satisfies the attribute 240, the NE 101 forwards to the data packet to the next hop on the PPR 120 (e.g., along link 124 to NE 104). In this manner, each of the NEs 101, 104, 105, 106, 112, and 111 on the PPR 120 to the egress NE 110 determines whether a next hop on the PPR 120 satisfies the attribute 240 and forwards the data packet to the next hop only when the next hop satisfies the attribute 240.

As data packets continue to be forwarded on the PPR 120 in the data plane, each of the NEs 101, 104, 105, 106, 112, 111, and 110 on the PPR 120 monitor and collect usage statistics 215 of network resources along the PPR 120. In an embodiment, usage statistics 215 refer to statistics regarding the usage of various resources along the PPR 120. In an embodiment, each of the NEs 101, 104, 105, 106, 112, 111, and 110 may be pre-configured by, for example, the operator of the network 100 or the central entity 175 to monitor usage statistics 215 of network resources along the PPR 120 or other paths along which the NEs 101, 104, 105, 106, 112, 110, and 110 transmit data.

After collecting the usage statistics 215, one or more of the NEs 101-112 may transmit the usage statistics 215 to the central entity 175 periodically or through any other offline mechanism such as gRPC, KAFKA or other streaming telemetry tools.

For example, assuming NE 104 collects usage statistics 215, such as the utilized bandwidth at link 126 along the PPR 120, the NE 104 may transmit this usage statistic 215 to the other NEs 101-103 and 105-107 in the area 150A using the underlying IGP. In an embodiment, the NE 101-112 within the network 100 that is configured to perform northbound communication with the central entity 175 to transmit control data to the central entity 175 transmits the usage statistics 215 to the central entity 175. For example, assume that the NE 103 is configured as the Border Gateway Protocol (BGP) Link State (BGP-LS) speaker enabled with BGP to perform northbound communication with the central entity 175. In this case, NE 103 transmits the usage statistics 215 to the central entity 175 using BGP-LS after having received the usage statistics 215 from NE 104. In another embodiment, the central entity 175 may request and receive usage statistics 215 directly from any of the NEs 101, 104, 105, 106, 112, 111, and 110 on the path using, for example, protocols such as g-Remote Procedure Calls (gRPC) or KAFKA.

In an embodiment, usage statistics 215 include data regarding the amount of used or unused resources on the PPR 120. The usage statistics 215 may include a per-PPR queuing delay occurring at an NE 101, 104, 105, 106, 112, 111, or 110 on a PPR 120 and a PPR bandwidth describing a utilized bandwidth on a link 124-126 and 133-135 attached to an NE 101, 104, 105, 106, 112, 111, or 110 on a PPR 120. The PPR bandwidth may also describe bandwidth violations occurring on a link 124-126 and 133-135 attached to an NE 101, 104, 105, 106, 112, 111, or 110 on a PPR 120. Additional details and examples of the usage statistics 215 are further described below with regard to FIGS. 8A-C. Although only these two examples of usage statistics 215 are described herein, it should be appreciated that usage statistics 215 includes any other measurement of utilized or unutilized network resources on a PPR 120.

Figure 3:
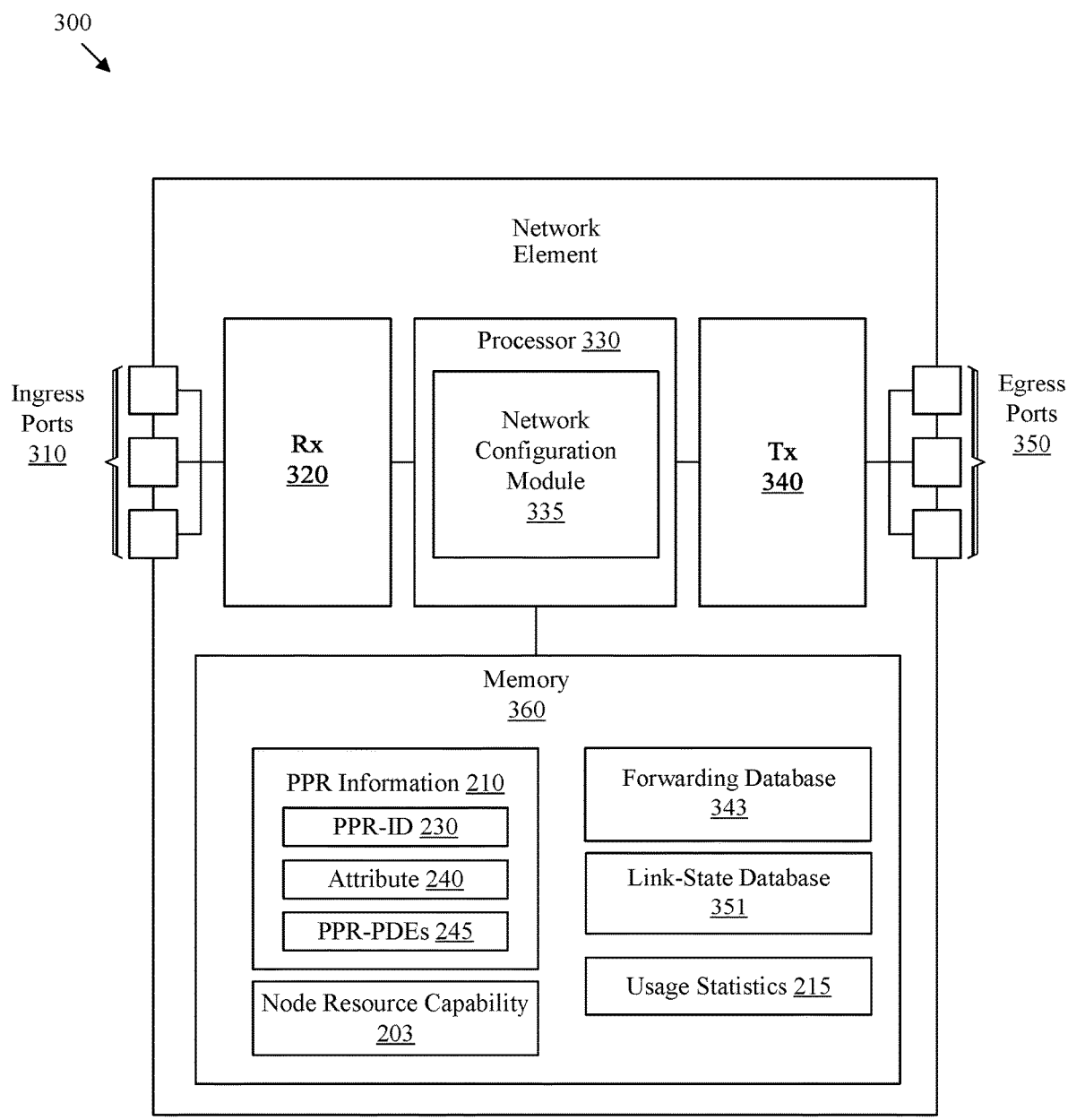
FIG. 3 is an embodiment of an NE in the network configured to implement preferred path routing according to various embodiments of the disclosure.

FIG. 3 is a diagram of an embodiment of an NE 300 in a network such as the network 100. NE 300 may be implemented as the central entity 175 or the NEs 101-112. The NE 300 may be configured to implement and/or support the routing mechanisms described herein. The NE 300 may be implemented in a single node or the functionality of NE 300 may be implemented in a plurality of nodes. One skilled in the art will recognize that the term NE encompasses a broad range of devices of which NE 300 is merely an example. While NE 300 is described as a physical device, such as a router or gateway, the NE 300 may also be a virtual device implemented as a router or gateway running on a server or a generic routing hardware (whitebox).

The NE 300 is included for purposes of clarity of discussion, but is in no way meant to limit the application of the present disclosure to a particular NE embodiment or class of NE embodiments. At least some of the features and/or methods described in the disclosure may be implemented in a network apparatus or module such as a NE 300. For instance, the features and/or methods in the disclosure may be implemented using hardware, firmware, and/or software installed to run on hardware. As shown in FIG. 3, the NE 300 comprises one or more ingress ports 310 and a receiver unit (Rx) 320 for receiving data, at least one processor, logic unit, or central processing unit (CPU) 330 to process the data, transmitter unit (Tx) 340 and one or more egress ports 350 for transmitting the data, and a memory 360 for storing the data.

The processor 330 may comprise one or more multi-core processors and be coupled to a memory 360, which may function as data stores, buffers, etc. The processor 330 may be implemented as a general processor or may be part of one or more application specific integrated circuits (ASICs) and/or digital signal processors (DSPs). The processor 330 may comprise a network configuration module 335, which may perform processing functions of the central entity 175 or the NEs 101-112. The network configuration module 335 may also be configured to perform the steps of method 900, and/or any other method discussed herein. As such, the inclusion of the network configuration module 335 and associated methods and systems provide improvements to the functionality of the NE 300. Further, the network configuration module 335 effects a transformation of a particular article (e.g., the network) to a different state. In an alternative embodiment, network configuration module 335 may be implemented as instructions stored in the memory 360, which may be executed by the processor 330.

The memory 360 may comprise a cache for temporarily storing content, e.g., a random-access memory (RAM). Additionally, the memory 360 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 360 may be configured to store the PPR information 210, which includes PPR-IDs 230, attributes 240, and the PPR-PDEs 245. In addition, the memory 360 is configured to store the node resource capability 203, usage statistics 215, a forwarding database 343, and a link state database 351. In an embodiment, the forwarding database 343 stores entries describing forwarding rules for how a particular NE 300 (e.g., NE 101-112 of FIGS. 1-2) should forward a data packet that includes a PPR-ID 230 and/or a destination address.

It is understood that by programming and/or loading executable instructions onto the NE 300, at least one of the processor 330 and/or memory 360 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus. In some embodiments, the NE 300 may be configured to implement OSPFv2, OSPFv3, IS-IS, or direct SDN controller based on network implementations.

FIGS. 4A-C are diagrams illustrating examples of a node resource capability 203 sent by an NE 101-112 in the network 100, and fields within the node resource capability 203, according to various embodiments of the disclosure. In particular, FIG. 4A is a diagram illustrating an example of a node resource capability 203 sent by an NE 101-112 to every other NE 101-112 in the area 150A-B or the network 100 and the central entity 175 according to various embodiments of the disclosure. As described above, the node resource capability 203 indicates various different capabilities of the NE 101-112 sending the node resource capability 203.

As shown in FIG. 4A, the node resource capability 203 includes a node ID 403 identifying the NE 101-112 sending the node resource capability 203. The node ID 403 may be a label, address, or ID that uniquely identifies the NE 101-112 sending the node resource capability 203.

The node resource capability 203 also includes resource reservation capabilities 406. The resource reservation capabilities 406 may include one or more flags indicating whether the NE 101-112 sending the node resource capability 203 is capable of reserving a resource on the PPR 120 according to an attribute 240. In an embodiment, the resource reservation capabilities 406 includes a flag indicating whether reserving a minimum or maximum bandwidth on a link 122-135 attached the NE 101-112 sending the node resource capability 203 is supported by the NE 101-112. In an embodiment, the resource reservation capabilities 406 includes a flag indicating whether setting a burst size or maximum burst size permitted to be transmitted on a link 122-135 attached the NE 101-112 sending the node resource capability 203 is supported by the NE 101-112. In an embodiment, the resource reservation capabilities 406 includes a flag indicating whether enforcing a per hop maximum queuing latency at the NE 101-112 sending the node resource capability 203 is supported by the NE 101-112. In an embodiment, the resource reservation capabilities 406 includes a flag which indicates whether setting and enforcing a lifetime or expiration timer for the PPR 120 is supported by the NE 101-112.

FIG. 4B shows an example a node resource capability 450 defined within a body of the IS-IS Router Capability TLV, as defined by RFC 7981, according to various embodiments of the disclosure. The node resource capability 450 also defines all the TE parameters that are supported by the NE 101-112 sending the node resource capability 450.

As shown by FIG. 4B, the node resource capability 450 includes a type field 453, a length field 456, and reservation capability (RC) flags field 459. The type field 453 may include a value assigned by the Internet Assigned Numbers Authority (IANA) from the IS-IS Router Capability TLV Registry. The value carried in the type field 453 indicates that the node resource capability 450 includes RC flags 459 related to resource reservation capabilities 406 on a PPR 120. The length field 456 includes a value indicating a total length of the node resource capability 450 in bytes. The RC flags field 459 is a 2 octet field including multiple flags, as represented in the reservation capability sub-TLV shown in FIG. 4C.

FIG. 4C shows an example of a reservation capability sub-TLV 470 that is included in the RC flags field 459 according to various embodiments of the disclosure. The RC flags field 459 may include four flags or bits: a B flag 473, a S flag 476, a L flag 479, a T flag 481, reserved bits 484, and an E flag 487.

The B flag 473, also referred to as Bit-0 or the B Bit, is set to indicate that minimum or maximum bandwidth reservation is supported by the NE 101-112 sending the node resource capability 450. The S flag 476, also referred to as Bit-1 or the S Bit, is set to indicate that burst size handling is supported by the NE 101-112 sending the node resource capability 450. The L flag 479, also referred to as Bit-2 or the L Bit, is set to indicate that per-hop maximum queuing is supported by the NE 101-112 sending the node resource capability 450. The T flag 481, also referred to as Bit-3 or the T Bit, is set to indicate that a lifetime, or expiration timer for the PPR 120 is supported by the NE 101-112 sending the node resource capability 450. The reserved bits 484 are empty and reserved for future use. The E flag 484, also referred to as Bit-15 or the E Bit, is set to indicate that one more 16-bit status field follows the E flag 484.

Figure 5A:
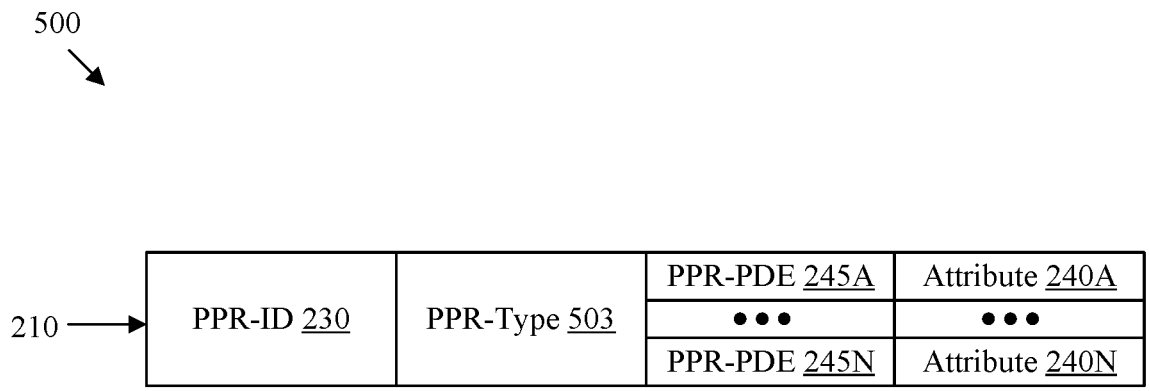
FIG. 5A is a diagram illustrating an example of an advertisement that includes PPR information according to various embodiments of the disclosure.
Figure 5B:
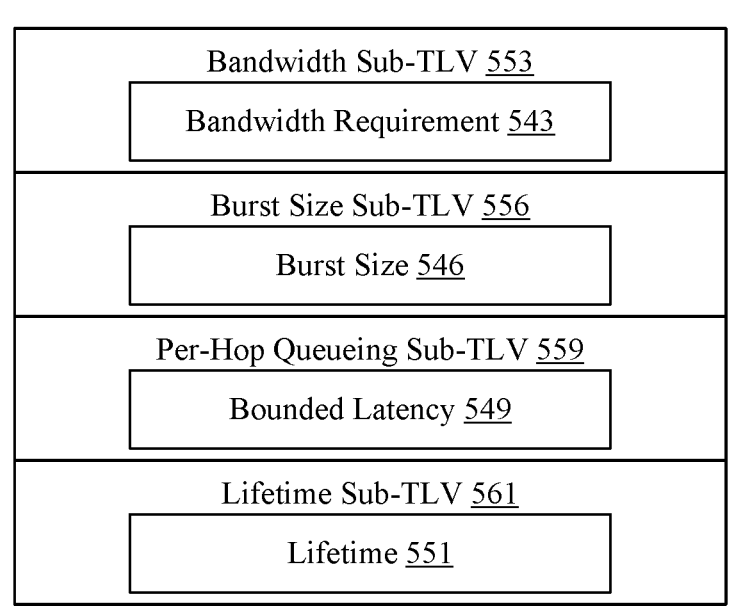
FIG. 5B is a diagram illustrating examples of the attributes carried in the PPR information describing a PPR according to various embodiments of the disclosure.

FIGS. 5A-B are diagrams illustrating an example of an advertisement 500 sent by an NE 101-112 in the network 100, and attributes 240 included in the advertisement 500, according to various embodiments of the disclosure. In particular, FIG. 5A is a diagram illustrating an example of an advertisement 500 including PPR information 210 according to various embodiments of the disclosure. As described above, the PPR information 210 describing the PPR 120 is received by a headend NE 101-112 by either the central entity 175 or an external entity, such as an operator of network 100. After receiving the PPR information 210, the headend NE 101-112 floods the advertisement 500 including the PPR information 210 through the entire respective area 150A—using an underlying IGP of the respective area 150A-B. Flooding the advertisement 500 throughout the respective area 150A-B refers to transmitting the advertisement 500 to every other NE 101-112 in the respective area 150A-B. The NE 101-112 may also flood the advertisement 500 through the entire domain (e.g., network 100) at which the headend NE 101-112 is located using an underlying IGP of the network 100. Flooding the advertisement 500 throughout the network 100 refers to transmitting the advertisement 500 to every other NE 101-112 in the network 100.

As shown in FIG. 5A, the PPR information 210 includes the PPR-ID 230, a PPR type 503, one or more PPR-PDEs 245A-N, and one or more attributes 240A-N. As described above, the PPR-ID 230 is a label, address, or identifier that uniquely identifies the PPR 120. The PPR-ID 230 may be encoded in many different ways, such as, for example, as an IPv4 address, IPv6 address, or MPLS label.

The PPR type 503 defines the kind or type of the labels, addresses, or IDs of the PPR-ID 230 and/or the elements 101-112 and 122-135 (NEs 101-112 and links 122-135) on the PPR 120, which are encoded in the PPR-PDEs 245A-N. As described above, each of the PPR-PDEs 245A-N includes a label, address, or ID identifying an element 101-112 and 122-135 on the PPR 120. For example, each of the elements 101-112 and 122-135 on the PPR 120 may be encoded as an MPLS label, an IPv4 address, an IPv6 address, etc. The PPR type 503 defines an encoding scheme used by the PPR-ID 230 and/or each of the PPR-PDEs 425A-N.

As described above, the attributes 240A-N describe one or more network characteristics or TE parameters that should be applied to at least one resource on the PPR 120. Various examples of the attributes 240A-N are described below with reference to FIG. 5B. While FIG. 5A only shows the PPR information 210 including the PPR-ID 230, the PPR type 503, one or more PPR-PDEs 245A-N, and one or more attributes 240A-N, the PPR information 210 may include other information as described in the PPR Patent.

FIG. 5B is a diagram illustrating examples of the attributes 240A-N carried in the PPR information 210 describing a PPR 120 according to various embodiments of the disclosure. As shown in FIG. 5B, the attributes 240A-N include a bandwidth sub-TLV 553, a burst size sub-TLV 556, a per-hop queuing sub-TLV 559, and a lifetime sub-TLV 561. While only these four attributes 240A-N are shown and described with reference to FIG. 5B, it should be appreciated that attributes 240A-N may include any other attribute defining a TE parameter or a network characteristic for a PPR 120.

The bandwidth sub-TLV 553 may be encoded to carry information regarding bandwidth requirement 543, such as a minimum bandwidth or a maximum bandwidth required to transmit a data packet along a link 124-126 and 133-135 of the PPR 120. For example, the bandwidth sub-TLV 553 may include a bandwidth requirement 543 defining a minimum bandwidth required on a link 124-126 and 133-135 of the PPR 120 to permit transmitting a data packet including a PPR-ID 230 corresponding to the PPR 120 along the link 124-126 and 133-135. Similarly, the bandwidth sub-TLV 553 may include a bandwidth requirement 543 defining a maximum bandwidth allowed on a link 124-126 and 133-135 of the PPR 120 to permit transmitting a data packet including a PPR-ID 230 corresponding to the PPR 120 along the link 124-126 and 133-135. An example of the bandwidth sub-TLV 553 is shown and described below with reference to FIG. 6A.

The burst size sub-TLV 556 may be encoded to carry a burst size 546, such as a maximum burst size of a burst transmitted along a link 124-126 and 133-135 of the PPR 120. For example, the burst size sub-TLV 556 may include burst size 546 defining a maximum burst size of a burst of data packets including the PPR-ID 230 permitted to be transmitted on a link 124-126 and 133-135 of the PPR 120. Similarly, the burst size sub-TLV 556 may include a burst size 546 defining minimum burst size of a burst of data packets including the PPR-ID 230 permitted to be transmitted on a link 124-126 and 133-135 of the PPR 120. An example of the burst size sub-TLV 556 is shown and described below with reference to FIG. 6B.

The per-hop queuing size sub-TLV 559 may be encoded to carry a bounded latency 549 for each element (e.g., NE 101, link 124, NE 104, link 125, NE 105, link 126, NE 106, link 135, NE 112, link 134, NE 111, link 133, and NE 110) or hop on the PPR 120. For example, the per-hop queuing size sub-TLV 559 may include a maximum bounded latency 549 permitted on each NE 101, 104, 105, 106, 112, 111, 110 on the PPR 120 such that data packets including the PPR-ID 230 for the PPR 120 may only be transmitted to NEs 101, 104, 105, 106, 112, 111, 110 with a bounded latency less than the maximum bounded latency 549. An example of the per-hop queuing size sub-TLV 559 is shown and described below with reference to FIG. 6C.

The lifetime sub-TLV 561 may be encoded to carry a lifetime 551 of the reservations made for the PPR 120 such that the reservations are teared down upon expiration of the lifetime 551. In an embodiment, tearing down the reservations refers to removing the PPR information 210 from the forwarding database 343 and/or removing the reservation of the resource along an element 101, 124, 104, 125, 105, 126, 106, 135, 112, 134, 111, 133, and 110.

The lifetime 551 may be indicated in the time unit of seconds. For example, the lifetime sub-TLV 561 may include a lifetime 551, or a maximum amount of time, that a resource is reserved for a PPR 120. For example, when an NE 101-112 receives an advertisement 500 with the PPR information 210 including a lifetime 551 for the PPR 120, the forwarding database 343 is updated to indicate the lifetime 551, and a soft timer is initiated and expected to expire at the time period indicated by the lifetime 551.

The lifetime 551 may be extended when a state refresh is received by the NE 101-112 from which the original PPR information 210 was received. In an embodiment, a state refresh is another advertisement 500 containing the same PPR information 210 for the PPR information 210. In an embodiment, when a state refresh is received from an originating headend NE 101-112 before the expiration of the soft timer, the lifetime 551 is reset and initiated again. If a state refresh is not received before the expiration of the soft timer, then the resources reserved for the PPR 120 are teared down and the forwarding database 343 is updated to reflect the tearing down of the PPR 120. An example of the lifetime sub-TLV 561 is shown and described below with reference to FIG. 6D.

Figure 6A:
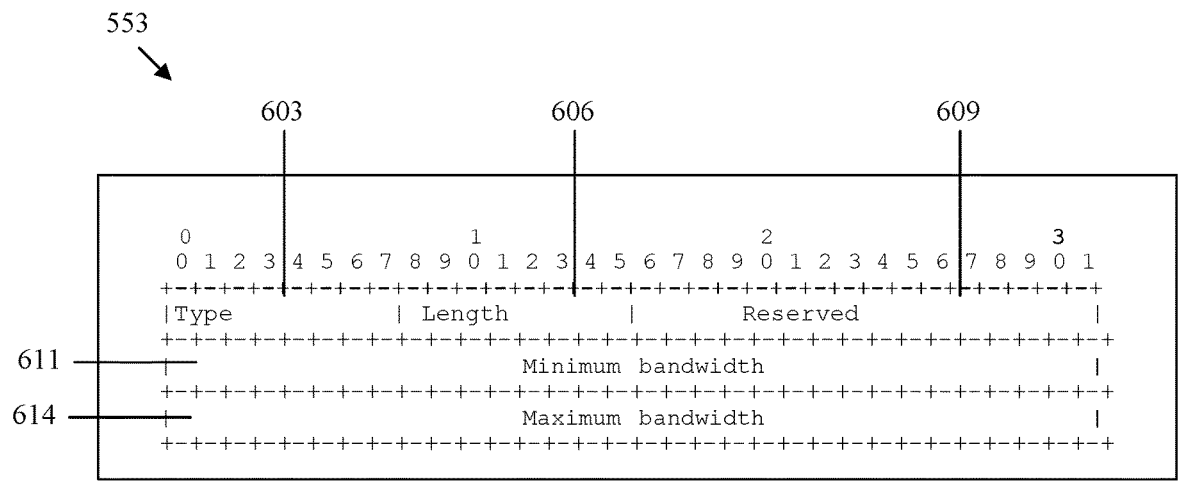
FIGS. 6A-D are diagrams illustrating examples of the attributes described in FIG. 5B according to various embodiments of the disclosure.
Figure 6B:
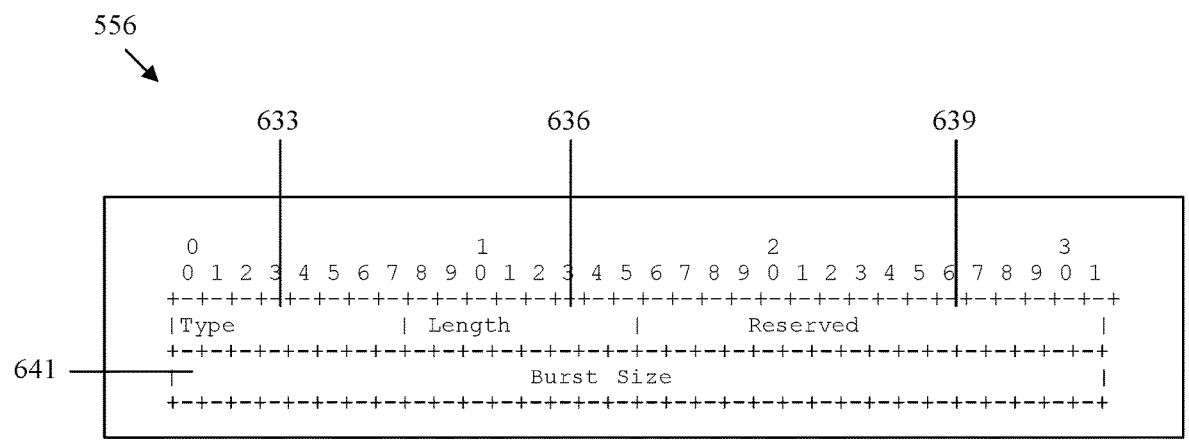
Figure 6C:
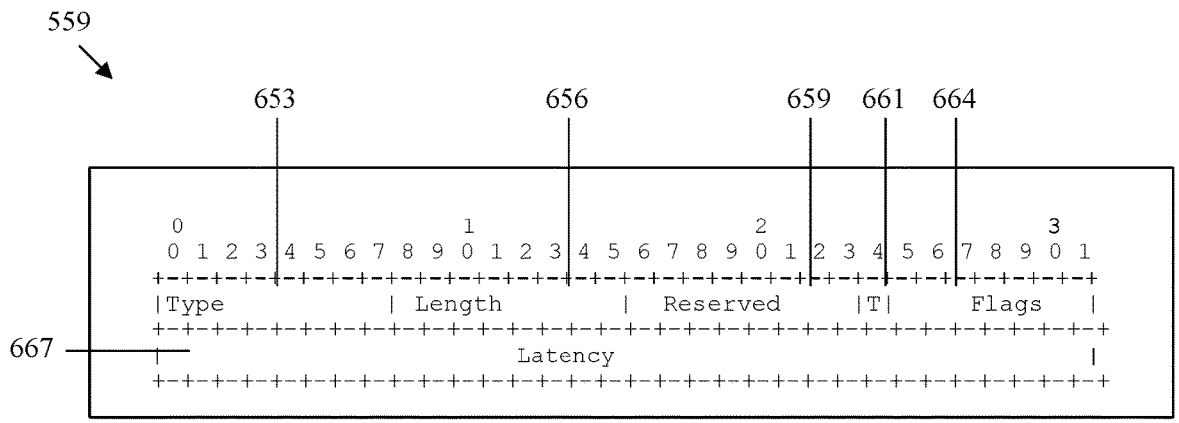
Figure 6D:
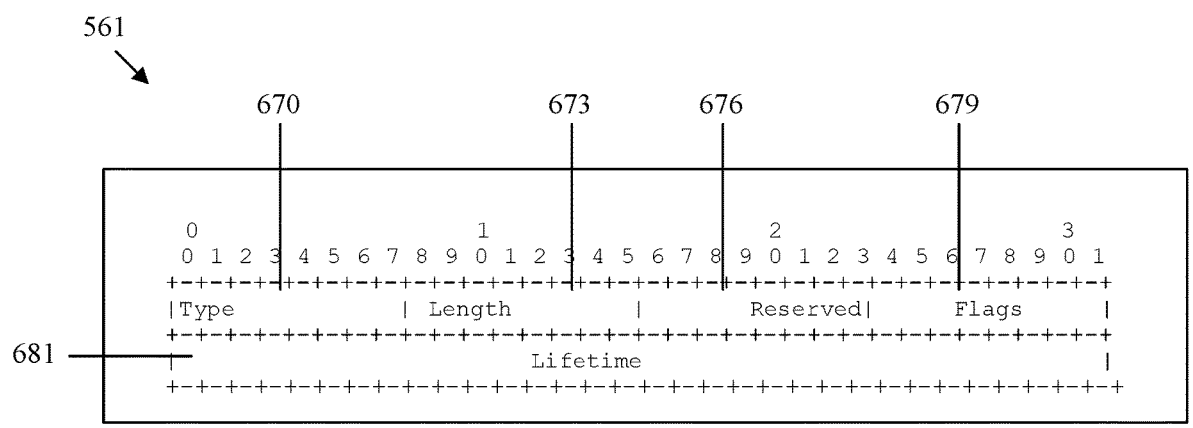

FIGS. 6A-D show examples of the attributes 240A-N described in FIG. 5B according to various embodiments of the disclosure. FIG. 6A shows an example of the bandwidth sub-TLV 553, FIG. 6B shows an example of a burst size sub-TLV 556, FIG. 6C shows an example of a per-hop queuing sub-TLV 559, and FIG. 6D shows an example of a lifetime sub-TLV 561. In an embodiment, the sub-TLVs for the various attributes 240A-N described in FIGS. 6A-D may be included in the IS-IS PPR Attribute Sub-TLV described in the PPR Patent. In an embodiment, the sub-TLVs for the various attributes 240A-N described in FIGS. 6A-D may be included in the OSPFv2 or OSPFv3 PPR Attribute Sub-TLV described in the PPR Patent. In another embodiment, the sub-TLVs for the various attributes 240A-N described in FIGS. 6A-D may be entirely new messages, or may be included in any other protocol by which NEs 101-112 transmit data.

Referring first to FIG. 6A, shown is an example of a bandwidth sub-TLV 553 including a type field 603, a length field 606, reserved bits 609, a minimum bandwidth 611, and a maximum bandwidth 614. The type field 603 includes a value indicating that the bandwidth sub-TLV 553 includes bandwidth related information (e.g., bandwidth requirement 543) associated with a resource to be reserved on the PPR 120. The value carried in the bandwidth sub-TLV 553 may be assigned by the IANA. The length field 606 is 10 octets and defines a length of the bandwidth sub-TLV 553. The reserved bits 609 are empty and reserved for future use.

The minimum bandwidth field 611 carries a bandwidth requirement 543 defining a minimum bandwidth (also referred to as committed information rate (CIR)) that is required on a link 124-126 and 133-135 attached to an NE 101, 104, 105, 106, 112, 111, and 110 on the PPR 120 for data packets (comprising the PPR-ID 230 of the PPR 120) to be transmitted over the link 124-126 and 133-135 on the PPR 120. The maximum bandwidth field 614 carries a bandwidth requirement 543 defining maximum bandwidth (also referred to as peak information rate (PIR)) that is required on a link 124-126 and 133-135 attached to an NE 101, 104, 105, 106, 112, 111, and 110 on the PPR 120 for data packets (comprising the PPR-ID 230 of the PPR 120) to be transmitted over the link 124-126 and 133-135 on the PPR 120. The minimum bandwidth and/or maximum bandwidth may be indicated in the minimum bandwidth field 611 and/or maximum bandwidth field 614, respectively, using the unit of megabits per second (Mbps). Although the bandwidth sub-TLV 553 includes fields 611 and 614 for both a minimum and maximum bandwidth, it should be appreciated that the bandwidth sub-TLV 553 may define only a minimum bandwidth, only a maximum bandwidth, or both a minimum and maximum bandwidth.

Referring next to FIG. 6B, shown is an example of a burst size sub-TLV 556 including a type field 633, a length field 636, reserved bits 639, and a burst size field 641. The type field 633 includes a value indicating that the burst size sub-TLV 556 includes burst size related information (e.g., burst size 546) associated with a resource to be reserved on the PPR 120. The value carried in the type field 633 may be assigned by the IANA. The length field 636 is 6 octets and defines a length of the burst size sub-TLV 556. The reserved bits 639 are empty and reserved for future use.

The burst size field 641 carries a burst size 546, which may define maximum burst size of a burst carried on a link 122-135 of the PPR 120. A burst refers to an aggregation of data packets including the PPR-ID 230 of PPR 120. The burst size 546 may be indicated in the burst size field 641 using the unit of 1000 (K) bytes.

Referring next to FIG. 6C, shown is an example of a per-hop queuing latency size sub-TLV 559 including a type field 653, a length field 656, reserved bits 659, a T flag 661, a flags field 664, and a latency field 667. The type field 653 includes a value indicating that the per-hop queuing latency size sub-TLV 559 includes per-hop queuing latency information (e.g., bounded latency 549) associated with an NE 101-112 on the PPR 120. The value carried in the type field 653 may be assigned by the IANA. The length field 656 is 6 octets and defines a length of the per-hop queuing latency size sub-TLV 559. The reserved bits 659 are empty and reserved for future use.

The T flag 661, also referred to as the T bit, is set to 0 if a bounded latency 549 carried in the latency field 667 is expressed in milliseconds. The T flag 661 is set to 1 if a bounded latency 549 carried in the latency field 667 is expressed in microseconds. The flags field 664 is one octet and includes one or more flags related to the bounded latency 549 carried the latency field 667. The latency field 667 carries a bounded latency 549 defined as an expected maximum queuing latency for each NE 101-112 on the PPR 120. In an embodiment, data packets (including the PPR-ID 230 of the PPR 120) may only be transmitted to or received by an NE 101, 104, 105, 106, 112, 111, and 110 on the PPR 120 if a queuing latency at that NE 101, 104, 105, 106, 112, 111, and 110 is less than the maximum queuing latency carried by the latency field 667. In an embodiment, when an attribute 240A-N carries an expected maximum queuing latency, a minimum bandwidth should also be carried in the attributes 240A-N.

Referring next to FIG. 6D, shown is an example of a lifetime sub-TLV 561 including a type field 670, a length field 673, reserved bits 676, a flags field 679, and a lifetime field 681. The type field 670 includes a value indicating that the lifetime sub-TLV 561 includes lifetime related information (e.g., lifetime 551) associated with the PPR 120. The value carried in the type field 670 may be assigned by the IANA. The length field 673 is 6 octets and defines a length of the lifetime sub-TLV 561. The flags field 679 is one octet and carries data associated with the lifetime 551 included in the lifetime field 681. The lifetime field 681 includes the lifetime 551, or the time period during which resources are reserved along a PPR 120, which can only be reset upon receiving a state refresh (another advertisement 500 with the same PPR information 210). The reserved bits 676 are empty and reserved for future use.

Therefore, FIGS. 5A-B and 6A-D describe the attributes 240A-N that are included in the PPR information 210 advertised for a PPR 120 and different ways to encode the attributes 240A-N into the advertisement 500. In an embodiment, the attributes 240A-N may be modified or updated by sending another advertisement 500 including modified attributes 240A-N in the PPR information 210. For example, the NE 101-112 that originally sent the advertisement 500 including the PPR information 210 may receive modified attributes 240A-N for the PPR 120 (from either an operator of the network 100 or a central entity 175). In this case, the NE 101-112 may send another advertisement 500 with the same PPR information 210, except including the modified attributes 240A-N instead of the originally sent attributes 240A-N. The receiving NEs 101-112 that receive the modified attributes 240A-N may update the locally stored forwarding database 343 to reflect the received modified attributes 240A-N.

FIGS. 7A-D are diagrams illustrating an example of a node status 220, and fields within the node status 200, sent by NEs 101, 104, 105, 106, 112, 111, and 110 on the PPR 120 to every other NE 101-112 in the area 150A-B or the network 100 and the central entity 175 according to various embodiments of the disclosure. As described above, a node status 220 is a message indicating whether a resource for the PPR 120 has been successfully reserved according to the attribute 240A-N included in the PPR information 210.

Figures 7A, 7B:
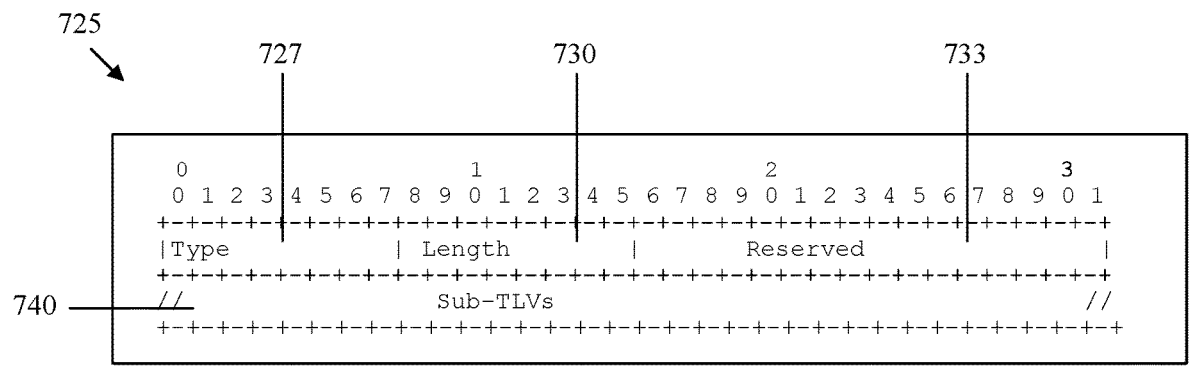
FIGS. 7A-D are diagrams illustrating an example of a node status sent by an NE on the PPR, and fields within the node status, according to various embodiments of the disclosure.

As shown in FIG. 7A, the node status 220 includes a node ID 403 identifying the NE 101, 104, 105, 106, 112, 111, and 110 sending the node status 220. The node ID 403 may be a label, address, or ID that uniquely identifies the NE 101, 104, 105, 106, 112, 111, and 110 sending the node status 220.

The node status 220 also includes a resource reservation status 706. The resource reservation status 706 may include one or sub-TLVs and one or more flags indicating a status of certain resources that have been reserved according to an attribute 240A-N (also referred to herein as "attribute 240") specified for the PPR 120. An example of a sub-TLV that may be included in the resource reservation status 706 is shown and described below with reference to FIGS. 7B-C. Examples of flags that may be included in the resource reservation status 706 is shown and described below with reference to FIG. 7D.

FIG. 7B shows an example of a node status TLV 725 that may be included in the resource reservation status 706 according to various embodiments of the disclosure. In an embodiment, the node status TLV 725 may be a new top level IS-IS TLV, OSPFv2 TLV, or OSPFv3 TLV defined to indicate the status of PPR TE resource reservation by each NE 101, 104, 105, 106, 112, 111, and 110 on the PPR 120. In this embodiment, the node status TLV 725 is generated by an NE 101, 104, 105, 106, 112, 111, and 110 on the PPR 120 which performs the reservation of resources. In another embodiment, the node status TLV 725 is an entirely new message, or can be encoded into another protocol by which NEs 101, 104, 105, 106, 112, 111, and 110 are configured to transmit data.

The node status TLV 725 includes a type field 727, a length field 730, reserved bits 733, and one or more sub-TLVs 740. The type field 727 carries a value assigned by the IANA indicating that the node status TLV 725 includes data regarding a status of resources reserved for a PPR 120. For example, the value may be assigned from the IS-IS top level TLV registry. The length field 730 includes a value indicating a total length of the node status TLV 725 in bytes. The sub-TLVs 740 are further described below with reference to FIG. 7C. The reserved bits 733 are empty and reserved for future use.

Figure 7C:
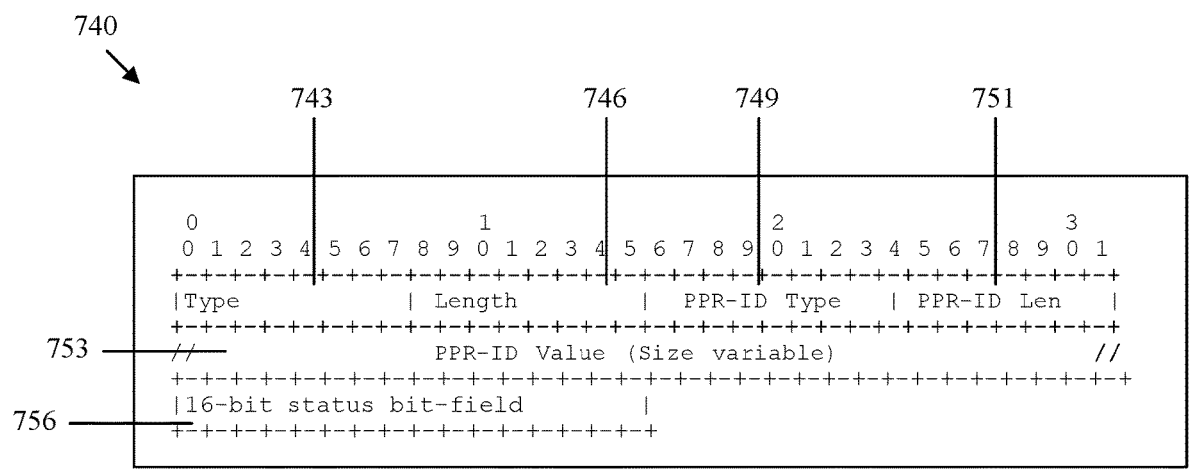

Referring next to FIG. 7C, shown is an example of a sub-TLV 740 included in a node status 220 according to various embodiments of the disclosure. As shown by FIG. 7C, the sub-TLV 740 includes a type field 743, a length field 746, a PPR-ID type field 749, a PPR-ID length field 751 (shown as PPR-ID Len in FIG. 7C), a PPR-ID value field 753, and a 16-bit status bit-field 756. The type field 743 carries a value assigned by the IANA indicating that the sub-TLV 740 includes data regarding a status of resources reserved for a PPR 120. The length field 746 includes a value indicating a total length of the sub-TLV 740 in bytes. The PPR-ID type field 749 carries a value indicating a type of PPR-ID 230 carried in the PPR-ID value field 753 (e.g., whether the PPR-ID 230 is an MPLS label, an IPV4 address, an IPv6 address, etc.). The PPR-ID length field 751 carries a length of the PPR-ID value field 753. The PPR-ID value field 753 carries the PPR-ID 230 identifying the PPR 120. The 16-bit status bit-field 756 includes various flags describing the status of resources reserved on the PPR 120 and is further described below with reference to FIG. 7D.

Figure 7D:
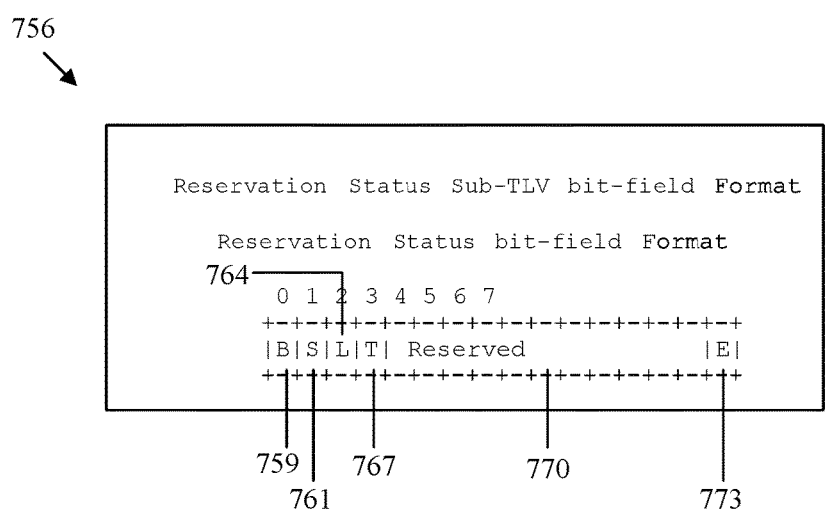

Referring next to FIG. 7D, shown is an example of a 16-bit status bit-field 756 included in a node status TLV 725 of a node status 220 according to various embodiments of the disclosure. The 16-bit status bit-field 756 includes a B flag 759, an S flag 761, an L flag 764, a T flag 767, reserved bits 770, and an E flag 773.

The B flag 759, also referred to as Bit-0 or the B Bit, indicates whether bandwidth requirement 543 (defined as either the minimum or maximum bandwidth reservation for a resource on the PPR 120) has been reserved by the NE 101, 104, 105, 106, 112, 111, or 110 sending the node status 220. The S flag 761, also referred to as Bit-1 or the S Bit, is set to indicate whether the burst size 546 handling on the PPR 120 has been set by the NE 101, 104, 105, 106, 112, 111, or 110 sending the node status 220. The L flag 764, also referred to as Bit-2 or the L Bit, is set to indicate whether a bounded latency 549 defined as a per-hop maximum queuing for the PPR 120 has been set by the NE 101, 104, 105, 106, 112, 111, or 110 sending the node status 220. The T flag 767, also referred to as Bit-3 or the T Bit, is set to indicate whether a lifetime 551 or expiration timer for the PPR 120 has been set by the NE 101, 104, 105, 106, 112, 111, or 110 sending the node status 220. The reserved bits 770 are empty and reserved for future use. The E flag 773, also referred to as Bit-15 or the E Bit, is set to indicate that one more 16 bit status field(s) follows the E flag 773.

In an embodiment, one of the NEs 101, 104, 105, 106, 112, 111, or 110 on the PPR 120 may identify that one of the elements 101, 124, 104, 125, 105, 126, 106, 135, 112, 134, 111, 133, or 110 on the PPR 120 is unavailable or failed. In this case, an NE 101, 104, 105, 106, 112, 111, or 110 adjacent to or attached to the unavailable element 101, 124, 104, 125, 105, 126, 106, 135, 112, 134, 111, 133, or 110 may notify the headend NE 101-112 that sent the original advertisement 500 of the unavailable element 101, 124, 104, 125, 105, 126, 106, 135, 112, 134, 111, 133, or 110. The NE 101-112 adjacent to or attached to the unavailable element 101, 104, 105, 106, 112, 111, or 110 may notify the NE 101-112 in the network 100 acting as the BGP-LS speaker, such that the BGP-LS speaker notifies the central entity 175 of the unavailable element 101, 124, 104, 125, 105, 126, 106, 135, 112, 134, 111, 133, or 110. In an embodiment, the central entity 175, which stores the network topology of network 100, determines another PPR 120 without the unavailable element 101, 124, 104, 125, 105, 126, 106, 135, 112, 134, 111, 133, or 110 satisfies the same attributes 240A-N as the original PPR 120, and transmits PPR information 210 related to the newly determined PPR 120 to a headend NE 101-112. The headend NE 101-112 again floods the area 150A-B or the network 100 with the PPR information 210 describing the newly determined PPR 120.

Figure 8A:
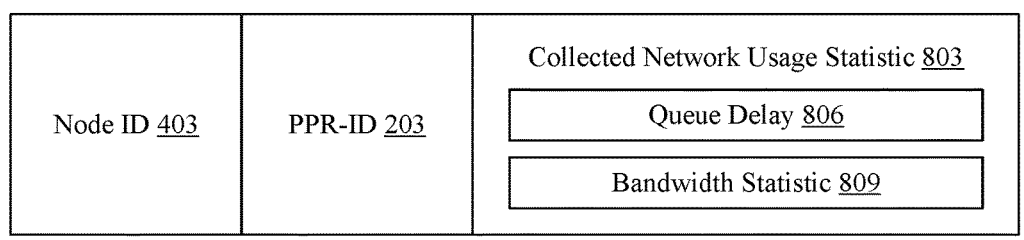
FIGS. 8A-C are diagrams illustrating an example of usage statistics collected by NEs on the PPR, and fields within the usage statistics, according to various embodiments of the disclosure.
Figure 8B:
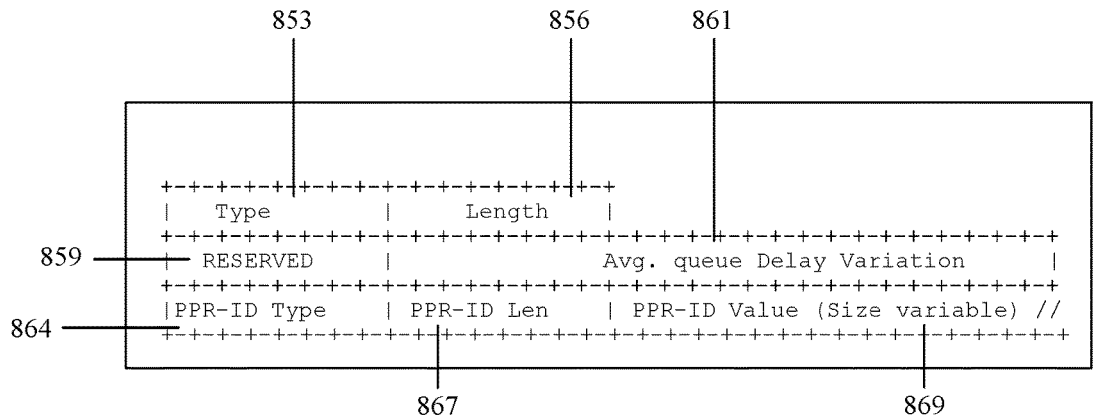
Figure 8C:
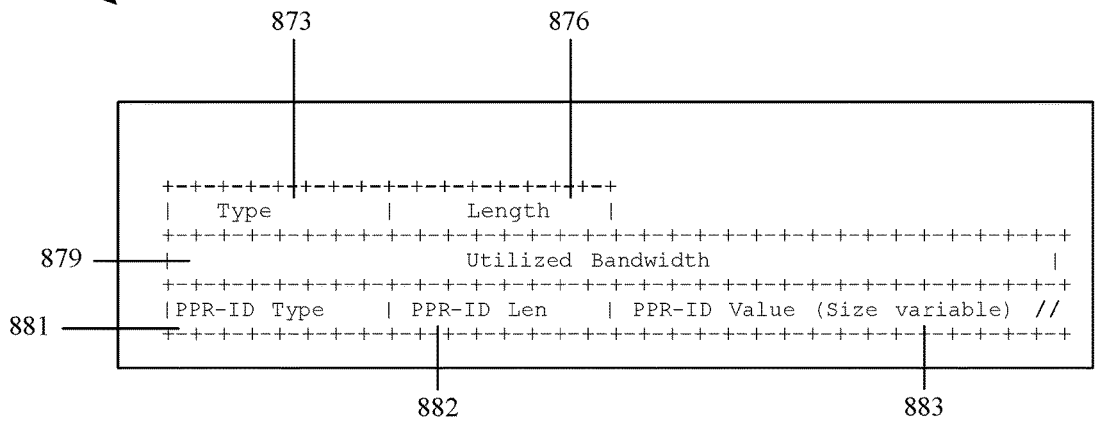

FIGS. 8A-C are diagrams illustrating an example of usage statistics 215 collected by NEs 101, 104, 105, 106, 112, 111, and 110 on the PPR 120, and fields within the usage statistics 215, according to various embodiments of the disclosure. As described above, usage statistics 215 refers to statistics regarding the usage of various resources along the PPR 120. In an embodiment, the usage statistics 215 may be flooded through the respective area 150A-B or network 100 until the usage statistics 215 reaches a BGP-LS speaker within the respective area 150A-B or network 100. The BGP-LS speaker then transmits the usage statistics 215 to the central entity 175, such that the central entity 175 may modify the PPR 120 if necessary. In another embodiment, the NE 101-112 may directly send the usage statistics 215 to the central entity 175, such that the central entity 175 may modify the PPR 120 if necessary.

As shown in FIG. 8A, the usage statistics 215 may include a node ID 403 identifying the NE 101, 104, 105, 106, 112, 111, and 110 on the PPR 120 sending the usage statistics 215. The node ID 403 may be a label, address, or ID that uniquely identifies the NE 101, 104, 105, 106, 112, 111, or 110 sending the usage statistics 215. The usage statistics 215 also includes a PPR-ID 230 identifying the PPR 120 being monitored and described by the usage statistics 215.

The usage statistics 215 also includes collected network usage statistics 803, which may include a queue delay 806 and a bandwidth statistics 809. The queue delay 806 indicates a queuing or transmission delay occurring at an NE 101, 104, 105, 106, 112, 111, and 110 on the PPR 120. The bandwidth statistics 809 includes bandwidth related statistics of the PPR 120, such as utilized bandwidth along a link 124-126 and 133-135 of the PPR 120, unutilized bandwidth along a link 124-126 and 133-135 of the PPR 120, or a bandwidth violation along a link 124-126 and 133-135 of the PPR 120. A bandwidth violation can occur because of local failures or due to resource exhaustion set aside for a PPR 120. Examples of TLVs or sub-TLVs carrying collected network usage statistics 803 included in the usage statistics 215 is shown and described below with reference to FIGS. 8B-C.

Referring next to FIG. 8B, shown is an example of a per-PPR queueing delay sub-TLV 850 that may be included in the usage statistics 215 according to various embodiments of the disclosure. In an embodiment, the per-PPR queueing delay sub-TLV 850 may be a new sub-TLV included in the IETF RFC 7810, entitled "IS-IS Traffic Engineering (TE) Metric Extensions," by S. Previdi, et. al., dated May 2016. In an embodiment, the per-PPR queueing delay sub-TLV 850 may be a new message for an existing protocol or a new protocol.

The per-PPR queueing delay sub-TLV 850 includes a type field 853, a length field 856, reserved bits 859, an average queue delay variation field 861, a PPR-ID type field 864, a PPR-ID length field 867 (shown as PPR-ID Len in FIG. 8B), and a PPR-ID value field 869. The type field 853 carries a value assigned by the IANA indicating that the per-PPR queueing delay sub-TLV 850 includes data regarding the queue delay 806 occurring at NEs 101, 104, 105, 106, 112, 111, or 110 along a PPR 120. The length field 856 includes a value indicating a total length of the per-PPR queueing delay sub-TLV 850 in bytes. The reserved bits 859 are set to 0 and reserved for future use.

The average queue delay variation field 861 is a 24 bit field that carries the queue delay 806, which is an average PPR queue delay variation over a configurable interval in microseconds. The average PPR queue delay variation is encoded into the average queue delay variation field 861 as an integer value. When the average queue delay variation is set to 0 in the average queue delay variation field 861, the NE 101, 104, 105, 106, 112, 111, or 110 sending the usage statistics 215 has not measured the average queue delay variation. The PPR-ID type field 864, the PPR-ID length field 867, and the PPR-ID value field 869 are similar to the PPR-ID type field 749, the PPR-ID length field 751, and the PPR-ID value field 753, respectively.

Referring next to FIG. 8C, shown is an example of a unidirectional utilized PPR bandwidth sub-TLV 870 that may be included in the usage statistics 215 according to various embodiments of the disclosure. In an embodiment, the unidirectional utilized PPR bandwidth sub-TLV 870 may be a new sub-TLV included in the IETF RFC 7810, entitled "IS-IS Traffic Engineering (TE) Metric Extensions," by S. Previdi, et. al., dated May 2016. In an embodiment, the unidirectional utilized PPR bandwidth sub-TLV 870 may be a new message for an existing protocol or a new protocol.

The unidirectional utilized PPR bandwidth sub-TLV 870 includes a type field 873, a length field 876, a utilized bandwidth field 879, a PPR-ID type field 881, a PPR-ID length field 882 (shown as PPR-ID Len in FIG. 8C), and a PPR-ID value field 883. The type field 873 carries a value assigned by the IANA indicating that the unidirectional utilized PPR bandwidth sub-TLV 870 includes bandwidth statistics 809 regarding a utilized bandwidth of a link 124-126 and 133-135 reserved along a PPR 120. The length field 876 includes a value indicating a total length of the unidirectional utilized PPR bandwidth sub-TLV 870 in bytes.

The utilized bandwidth field 879 is a field that carries the bandwidth statistic 809, which may be bandwidth utilization per PPR 120 (or per PPR-ID 230) on a link 124-126 and 133-135 along a PPR 120, forwarding adjacency, or bundled link floating-point format with units of bytes per second. The PPR-ID type field 881, the PPR-ID length field 882, and the PPR-ID value field 883 are similar to the PPR-ID type field 749, the PPR-ID length field 751, and the PPR-ID value field 753, respectively.

Figure 9:
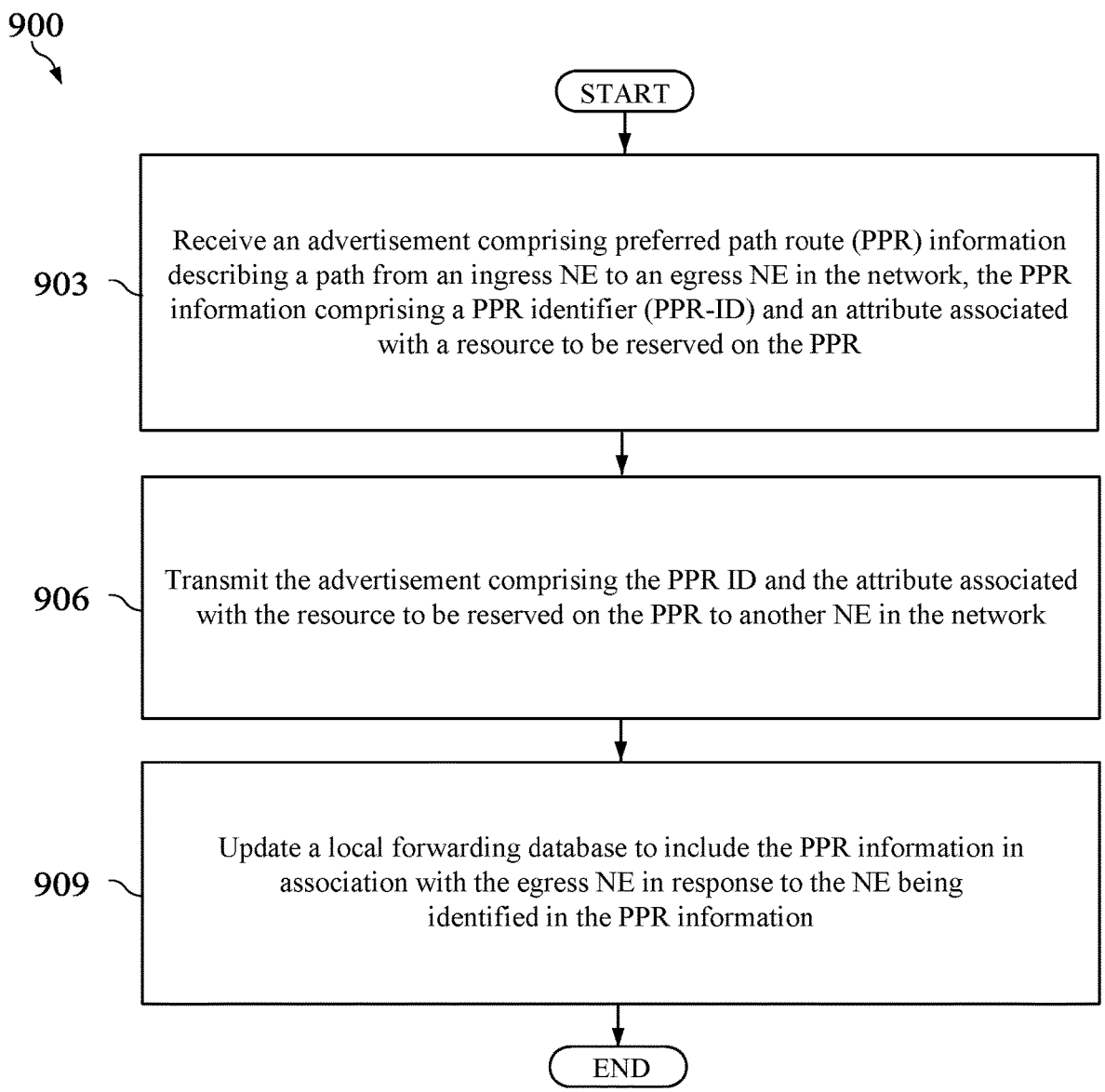
FIG. 9 is a method for implementing resource reservation and maintenance on a PPR according various embodiments of the disclosure.

FIG. 9 is a method 900 for implementing resource reservation and maintenance on a PPR 120 according various embodiments of the disclosure. In an embodiment, method 900 may be performed by a headend or ingress NE 101-112 in a network 100. In an embodiment, method 900 may be performed after a central entity 175 obtains and transmits PPR information 210 to an NE 101-112 in the network 100.

At step 903, an advertisement 500 comprising PPR information 210 describing a path from a source to a destination is received. For example, Rx 320 receives the PPR information 210 from the central entity 175 or another NE 101-112. The PPR information 210 includes a PPR-ID 230 and an attribute 240 associated with a resource to be reserved on the PPR 120. In an embodiment, the source may refer to the source 170 or an ingress NE 101 on the PPR 120. In an embodiment, the destination may refer to the destination 180 or the egress NE 110 on the PPR 120.

At step 906, the advertisement 500 comprising the PPR-ID 230 and the attributes 240 specified for a PPR 120 are transmitted to another NE in the network 100. For example, Tx 340 transmits the advertisement 500 comprising the PPR-ID 230 and the attributes 240 specified for a PPR 120 that are transmitted to another NE in the network 100.

At step 909, a local forwarding database 343 is updated to include the PPR information 210 in association with the destination in response to the NE 101-112 being identified in the PPR information 210. For example, local forwarding database 343 is updated in the memory 360 to include the attributes 240 in association with the PPR-ID 230.

Figure 10:
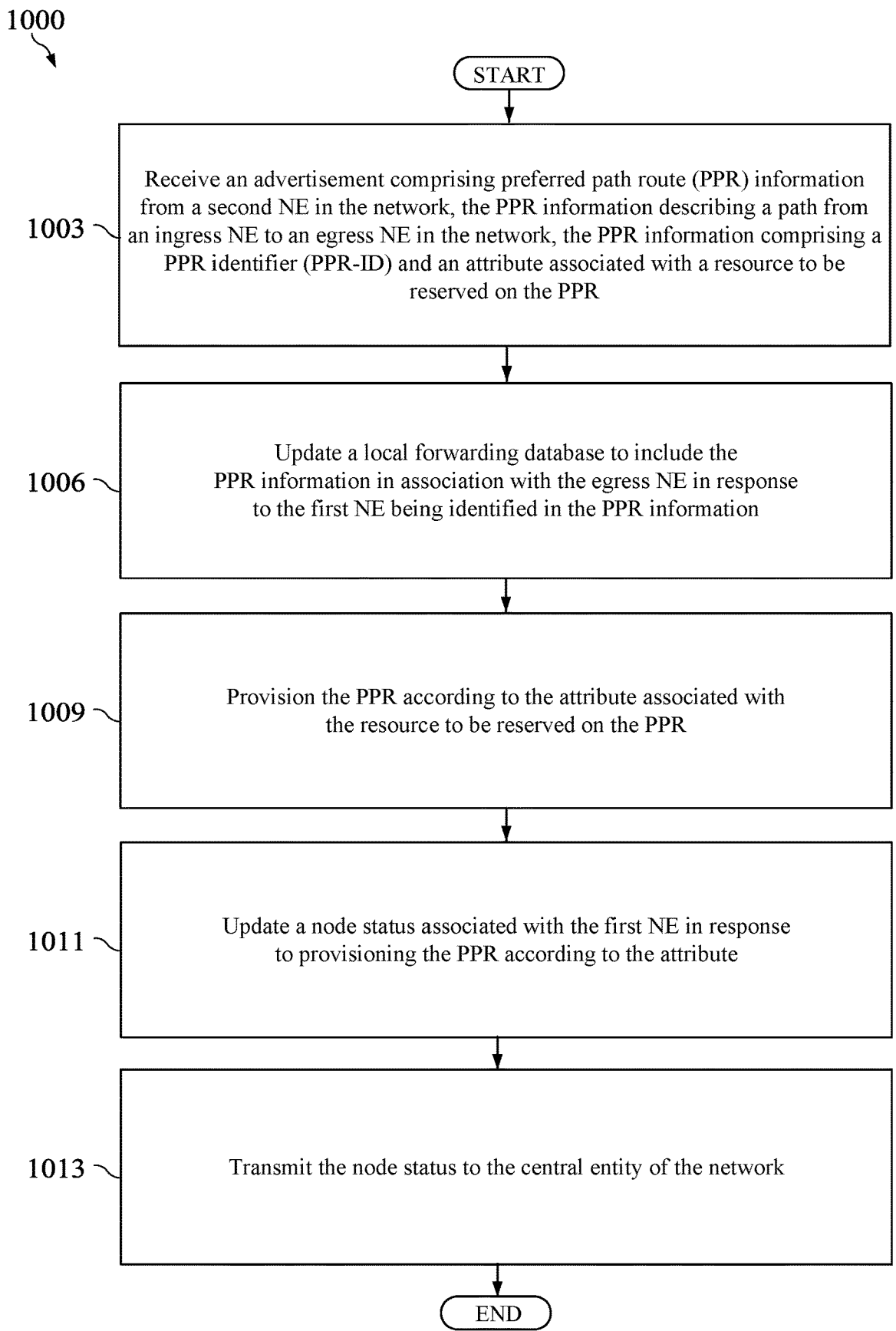
FIG. 10 is another method for implementing resource reservation and maintenance on a PPR according various embodiments of the disclosure.

FIG. 10 is a method 1000 for implementing resource reservation and maintenance on a PPR 120 according various embodiments of the disclosure. In an embodiment, method 1000 may be performed by an intermediate NE 101-112 (referred to with reference to this method 1000 as the first NE 101-112) in a network 100.

At step 1003, an advertisement 500 comprising PPR information 210 describing a path from a source to a destination is received from another NE 101-112. For example, Rx 320 receives the PPR information 210 from the central entity 175 or another NE 101-112. The PPR information 210 includes a PPR-ID 230 and an attribute 240 associated with a resource to be reserved on the PPR 120. In an embodiment, the source may refer to the source 170 or an ingress NE 101 on the PPR 120. In an embodiment, the destination may refer to the destination 180 or the egress NE 110 on the PPR 120.

At step 1006, a local forwarding database 343 is updated to include the PPR information 210 in association with the destination or egress NE in response to the first NE 101-112 being identified in the PPR information 210. For example, local forwarding database 343 is updated in the memory 360 to include the attributes 240 in association with the PPR-ID 230.

At step 1009, the PPR 120 is provisioned at the first NE 101-112 based on the attribute 240 in the PPR information 210. For example, the resource associated with the attribute 240 is reserved for the PPR 120 by the first NE 101-112.

At step 1011, a node status 220 of the first NE 101-112 is updated to indicate whether the resource for the PPR 120 has been successfully reserved according to the attribute 240 included in the PPR information 220. For example, the network configuration module 335 is executed by the processor 330 to update the node status 220 of the first NE 101-112 to indicate whether the resource for the PPR 120 has been successfully reserved according to the attribute 240 included in the PPR information 220.

At step 1013, the node status 220 is transmitted to the central entity 175. For example, Tx 340 transmits the node status 220 to the central entity 175.

Figure 11:
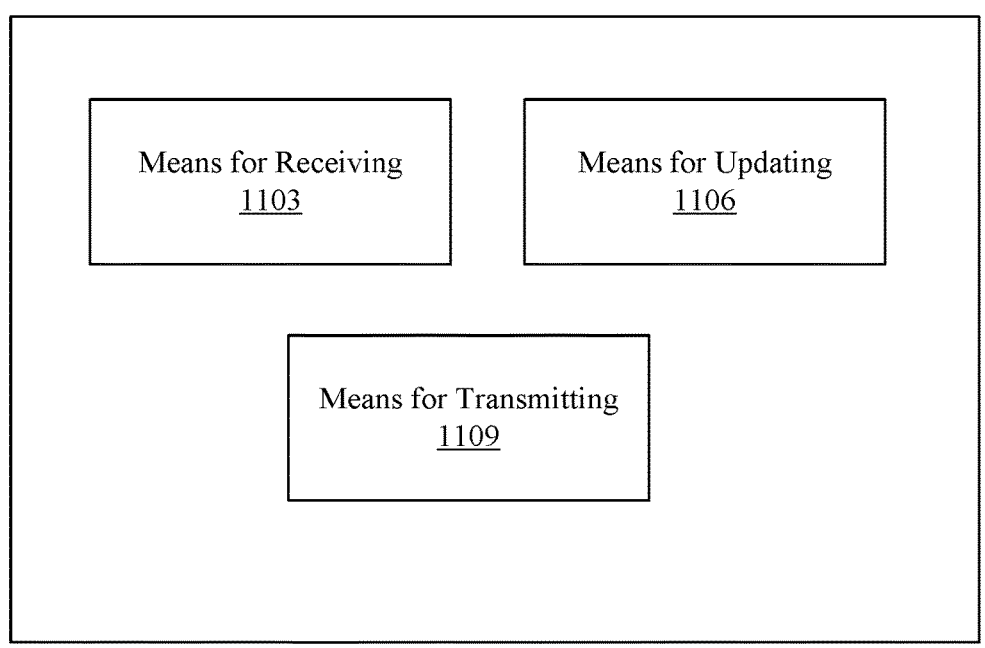
FIG. 11 is an apparatus for implementing resource reservation and maintenance on a PPR according various embodiments of the disclosure.

FIG. 11 shows an apparatus 1100 for implementing resource reservation and maintenance on a PPR 120 according various embodiments of the disclosure. The apparatus 1100 comprises a means for receiving 1103, a means for updating 1106, and a means for transmitting 1109. The means for receiving 1103 comprises a means to receive an advertisement 500 comprising PPR information 210 describing a path from a source to a destination. The PPR information 210 includes a PPR-ID 230 and an attribute 240 associated with a resource to be reserved on the PPR 120. In an embodiment, the source may refer to the source 170 or an ingress NE 101 on the PPR 120. In an embodiment, the destination may refer to the destination 180 or the egress NE 110 on the PPR 120. The means for updating 1106 comprises a means to update a local forwarding database 343 to include the PPR information 210 in association with the destination. The means for transmitting 1109 comprises a means to transmit the advertisement 500 comprising the PPR-ID 230 and the attributes 240 specified for a PPR 120 to another NE 101-112 in the network 100.

Figure 12:
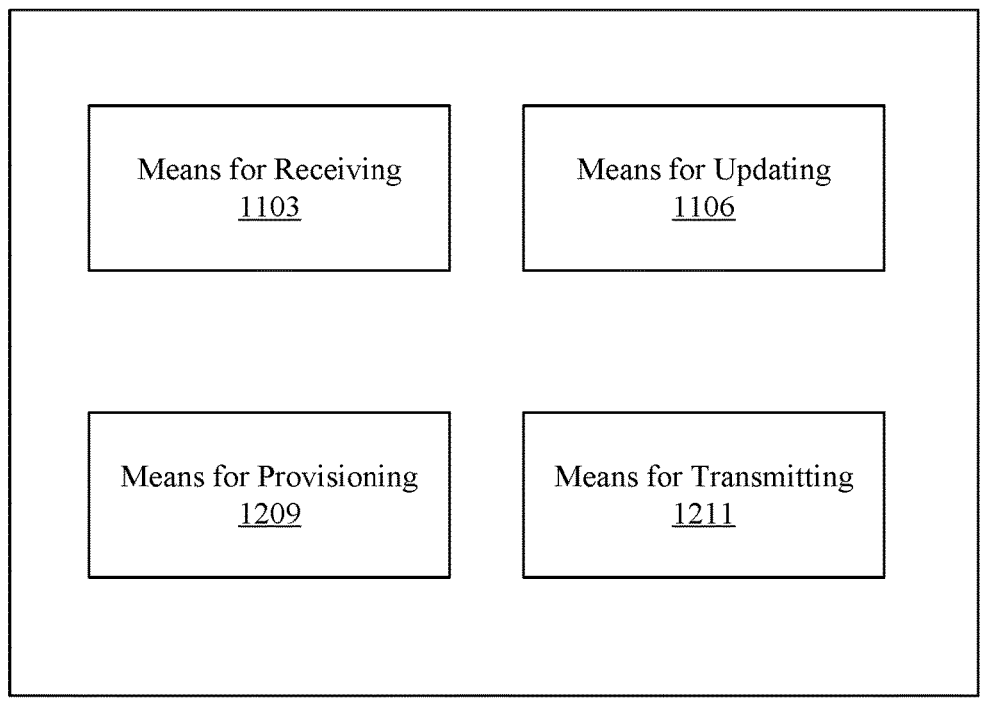
FIG. 12 is another apparatus for implementing resource reservation and maintenance on a PPR according various embodiments of the disclosure.

FIG. 12 shows an apparatus 1200 for implementing resource reservation and maintenance on a PPR 120 according various embodiments of the disclosure. The apparatus 1200 comprises a means for receiving 1203, a means for updating 1206, a means for provisioning 1209, and a means for transmitting 1211. The means for receiving 1203 comprises a means to receive an advertisement 500 comprising PPR information 210 describing a path from a source to a destination from another NE 101-112. The PPR information 210 includes a PPR-ID 230 and an attribute 240 associated with a resource to be reserved on the PPR 120. In an embodiment, the source may refer to the source 170 or an ingress NE 101 on the PPR 120. In an embodiment, the destination may refer to the destination 180 or the egress NE 110 on the PPR 120. The means for updating 1206 comprises a means to update a local forwarding database 343 to include the PPR information 210 in association with the destination in response to the apparatus 1200 being identified in the PPR information 210. The means for provisioning 1209 comprises a means to provision the PPR 120 based on the attribute 240 included in the PPR information 210. The means for updating 1206 further comprises a means to update a node status 220 of the apparatus 1200 to indicate whether the resource for the PPR 120 has been successfully reserved according to the attribute 240 included in the PPR information 220. The means for transmitting 1211 comprises a means to transmit the node status 220 to the central entity 175.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network element (NE) in a network, comprising:
transmitting, to one or more other NEs in the network, a node resource capability message including one or more flags indicating each usage statistic that the NE is capable of monitoring for a resource reserved in the network;
receiving, an advertisement comprising preferred path route (PPR) information describing a path from an ingress NE to an egress NE in the network after transmitting the node resource capability message, the PPR information comprising a PPR identifier (PPR-ID) and an attribute associated with a resource to be reserved on the PPR;
transmitting the advertisement comprising the PPR-ID and the attribute associated with the resource to be reserved on the PPR to one or more other NEs in the network;
updating a local forwarding database to include the PPR information in association with the egress NE in response to the NE being identified in the PPR information;
collecting the usage statistics of the resource, which the NE is capable of monitoring, after transmitting the node resource capability message and updating the local forwarding database to include the PPR information, the usage statistics describing network characteristics of the resource to be reserved on the PPR; and
transmitting the usage statistics of the resource to the one or more other NEs in the network.

2. The method of claim 1, wherein the attribute includes at least one of a bandwidth required to transmit a data packet along the PPR, a burst size permitted to be transmitted along the PPR, a bounded latency permitted to occur on an NE along the PPR, or a lifetime indicating a time period during which the resource is to be reserved on each element of the PPR.

3. The method of claim 2, further comprising:
deleting the PPR information from the local forwarding database in response to determining that a state refresh including the PPR information has not been received by the NE within the time period during which the resource is reserved; and
removing a reservation of the resource on the one or more NEs or links on the PPR in response to determining that the state refresh including the PPR information has not been received by the NE within the lifetime.

4. The method of claim 1, further comprising receiving a state refresh from at least one of a central entity of the network or a second NE in the network, wherein the state refresh comprises the PPR information.

5. The method of claim 1, further comprising:
receiving, by the NE, a modification of the attribute associated with the resource reserved on the PPR from at least one of a central entity of the network or a second NE in the network; and
updating, by the NE, the local forwarding database based on the modification of the attribute received.

6. The method of claim 1, further comprising determining, by the NE, that at least one NE or link on the PPR fails to satisfy the attribute defined by the PPR information.

7. The method of claim 1, further comprising transmitting a status to at least one of another NE or a central entity in the network using an underlying Interior Gateway Protocol (IGP) of the network, wherein the status indicates whether the resource has been successfully reserved based on the attribute included in the PPR information.

8. The method of claim 1, wherein the usage statistics are collected periodically after reserving the resource for the PPR based on the PPR information, and wherein the usage statistics comprises at least one of a queue delay that occurs as a plurality of data packets are transmitted from the NE to another NE on the PPR or bandwidth statistics regarding at least one link coupled to the NE.

9. A network element (NE) implemented in a network, comprising:
a memory configured to store instructions; and
a processor coupled to the memory and configured to execute the instructions, which cause the processor to be configured to:
transmit, to one or more other NEs in the network, a node resource capability message including one or more flags indicating each usage statistic that the NE is capable of monitoring for a resource reserved in the network;
receive an advertisement comprising preferred path route (PPR) information describing a path from an ingress NE to an egress NE in the network after transmitting the node resource capability message, the PPR information comprising a PPR identifier (PPR-ID) and an attribute associated with a resource to be reserved on the PPR;
transmit the advertisement comprising the PPR-ID and the attribute associated with the resource to be reserved on the PPR to the one or more other NEs in the network;
update a local forwarding database to include the PPR information in association with the egress NE;
collect the usage statistics of the resource, which the NE is capable of monitoring, after transmitting the node resource capability message and updating the local forwarding database to include the PPR information, the usage statistics describing network characteristics of the resource to be reserved on the PPR; and
transmit the usage statistics of the resource to the one or more other NEs in the network.

10. The NE of claim 9, wherein the attribute includes at least one of a bandwidth required to transmit a data packet along the PPR, a burst size permitted to be transmitted along the PPR, a bounded latency permitted to occur on an NE along the PPR, or a lifetime indicating a time period during which the resource is to be reserved on each element of the PPR.

11. The NE of claim 10, wherein the instructions further cause the processor to be configured to:
delete the PPR information from the local forwarding database in response to determining that a state refresh including the PPR information has not been received by the NE within the time period during which the resource is reserved; and
remove a reservation of the resource on the one or more NEs or links on the PPR in response to determining that the state refresh including the PPR information has not been received by the NE within the lifetime.

12. The NE of claim 9, wherein the instructions further cause the processor to be configured to receive a state refresh from at least one of a central entity of the network or a second NE in the network, wherein the state refresh comprises the PPR information.

13. The NE of claim 9, wherein the instructions further cause the processor to be configured to:
    receive a modification of the attribute associated with the resource reserved on the PPR from at least one of a central entity of the network or a second NE in the network; and
    update the local forwarding database based on the modification of the attribute received.

14. The NE of claim 9, wherein the instructions further cause the processor to be configured to determine that at least one NE or link on the PPR fails to satisfy the attribute defined by the PPR information.

15. The NE of claim 9, wherein the instructions further cause the processor to be configured to transmit a status to at least one of another NE or a central entity in the network using an underlying Interior Gateway Protocol (IGP) of the network, wherein the status indicates whether the resource has been successfully reserved based on the attribute included in the PPR information.

16. A non-transitory computer readable medium configured to store a computer program product comprising computer executable instructions that, when executed by a processor of a network element (NE) implemented in a network, cause the processor to:
    transmit, to one or more other NEs in the network, a node resource capability message including one or more flags indicating each usage statistic that the NE is capable of monitoring for a resource reserved in the network;
    receive an advertisement comprising preferred path route (PPR) information describing a path from an ingress NE to an egress NE in the network after transmitting the node resource capability message, the PPR information comprising a PPR identifier (PPR-ID) and an attribute associated with a resource to be reserved on the PPR;
    transmit the advertisement comprising the PPR-ID and the attribute associated with the resource to be reserved on the PPR to the one or more other NEs in the network;
    update a local forwarding database to include the PPR information in association with the egress NE in response to the NE being identified in the PPR information;
    collect the usage statistics of the resource, which the NE is capable of monitoring, after transmitting the node resource capability message and updating the local forwarding database to include the PPR information, the usage statistics describing network characteristics of the resource to be reserved on the PPR; and
    transmit the usage statistics of the resource to one or more other NEs in the network.

17. The non-transitory computer readable medium of claim 16, wherein the attribute includes at least one of a bandwidth required to transmit a data packet along the PPR, a burst size permitted to be transmitted along the PPR, a bounded latency permitted to occur on an NE along the PPR, or a lifetime indicating a time period during which the resource is to be reserved on each element of the PPR.

18. The non-transitory computer readable medium of claim 17, wherein the computer executable instructions further cause the processor to:
    delete the PPR information from the local forwarding database in response to determining that a state refresh including the PPR information has not been received by the NE within the time period during which the resource is reserved; and
    remove a reservation of the resource on the one or more NEs or links on the PPR in response to determining that the state refresh including the PPR information has not been received by the NE within the lifetime.

19. The non-transitory computer readable medium of claim 16, wherein the computer executable instructions further cause the processor to receive a state refresh from at least one of a central entity of the network or a second NE in the network, wherein the state refresh comprises the PPR information.

20. The non-transitory computer readable medium of claim 16, wherein the computer executable instructions further cause the processor to determine that at least one NE or link on the PPR fails to satisfy the attribute defined by the PPR information.

* * * * *

UNITED STATES PATENT AND TRADEMARK OFFICE
CERTIFICATE OF CORRECTION

| | |
|---|---|
| PATENT NO. | : 11,496,388 B2 |
| APPLICATION NO. | : 17/078838 |
| DATED | : November 8, 2022 |
| INVENTOR(S) | : Uma S. Chunduri et al. |

It is certified that error appears in the above-identified patent and that said Letters Patent is hereby corrected as shown below:

In the Claims

Column 29, Claim 16, Lines 23-43, through Column 30, Lines 1-12, should read:
16. A non-transitory computer readable medium configured to store a computer program product comprising computer executable instructions that, when executed by a processor of a network element (NE) implemented in a network, cause the processor to:
    transmit, to one or more other NEs in the network, a node resource capability message including one or more flags indicating each usage statistic that the NE is capable of monitoring for a resource reserved in the network;
    receive an advertisement comprising preferred path route (PPR) information describing a path from an ingress NE to an egress NE in the network after transmitting the node resource capability message, the PPR information comprising a PPR identifier (PPR-ID) and an attribute associated with a resource to be reserved on the PPR;
    transmit the advertisement comprising the PPR-ID and the attribute associated with the resource to be reserved on the PPR to the one or more other NEs in the network;
    update a local forwarding database to include the PPR information in association with the egress NE in response to the NE being identified in the PPR information;
    collect the usage statistics of the resource, which the NE is capable of monitoring, after transmitting the node resource capability message and updating the local forwarding database to include the PPR information, the usage statistics describing network characteristics of the resource to be reserved on the PPR; and
    transmit the usage statistics of the resource to the one or more other NEs in the network.

Signed and Sealed this
Sixth Day of December, 2022

Katherine Kelly Vidal
*Director of the United States Patent and Trademark Office*